(12) United States Patent
Andrick

(10) Patent No.: US 11,164,206 B2
(45) Date of Patent: Nov. 2, 2021

(54) AUTOMATICALLY AGGREGATING, EVALUATING, AND PROVIDING A CONTEXTUALLY RELEVANT OFFER

(71) Applicant: Comenity LLC, Columbus, OH (US)

(72) Inventor: Shannon Andrick, Columbus, OH (US)

(73) Assignee: Comenity LLC, Columbus, OH (US)

( * ) Notice: Subject to any disclaimer, the term of this patent is extended or adjusted under 35 U.S.C. 154(b) by 133 days.

(21) Appl. No.: 16/194,189

(22) Filed: Nov. 16, 2018

(65) Prior Publication Data
US 2020/0160372 A1    May 21, 2020

(51) Int. Cl.
G06Q 30/00    (2012.01)
G06Q 30/02    (2012.01)
G06F 16/2457    (2019.01)

(52) U.S. Cl.
CPC ... *G06Q 30/0239* (2013.01); *G06F 16/24575* (2019.01); *G06F 16/24578* (2019.01)

(58) Field of Classification Search
CPC ....... G06Q 30/0239; H04W 4/23; G06N 3/02; G06F 16/24575; G06F 16/24578
USPC ....................................................... 705/14.39
See application file for complete search history.

(56) References Cited

U.S. PATENT DOCUMENTS

| | | | | |
|---|---|---|---|---|
| 4,805,222 A * | 2/1989 | Young | ............... | G07C 9/35 382/115 |
| 4,912,761 A * | 3/1990 | Tan | ............... | H04N 1/448 358/400 |
| 4,924,387 A * | 5/1990 | Jeppesen | ............... | G06Q 50/18 360/13 |
| 5,184,849 A * | 2/1993 | Taylor | ............... | G03C 5/08 283/17 |
| 5,491,735 A * | 2/1996 | Hsieh | ............... | A61B 6/032 378/15 |
| 5,519,827 A * | 5/1996 | Mizushima | ............... | G06F 3/0483 715/807 |
| 5,521,907 A * | 5/1996 | Ennis, Jr. | ............... | H04L 41/5038 370/253 |
| 5,557,686 A * | 9/1996 | Brown | ............... | G07C 9/33 382/115 |
| 5,721,765 A * | 2/1998 | Smith | ............... | G06Q 20/342 379/93.03 |
| 5,748,740 A * | 5/1998 | Curry | ............... | G06Q 20/341 705/65 |
| 5,764,275 A * | 6/1998 | Lappington | ............... | A63F 13/12 725/136 |

(Continued)

OTHER PUBLICATIONS 101 references (1974-2013).*

(Continued)

*Primary Examiner* — David J Stoltenberg
*Assistant Examiner* — Michael I Ezewoko

(57) ABSTRACT

Systems and methods for automatically aggregating, evaluating, and providing a contextually relevant offer or incentive is disclosed. One method obtains a plurality of offers for a customer. Each of the plurality of offers is then evaluated to determine a contextual relevance of each of the plurality of offers. Each of the plurality of offers is then sorted into a best contextually relevant offer to a least contextually relevant offer order. The obtaining, evaluating, and sorting is continuously repeated until a time for using an offer is identified. The system and method then present the best contextually relevant offer.

2 Claims, 5 Drawing Sheets

(56) References Cited

U.S. PATENT DOCUMENTS

| | | | | |
|---|---|---|---|---|
| 5,886,334 | A * | 3/1999 | D'Entremont | B42D 25/328 235/380 |
| 5,892,900 | A * | 4/1999 | Ginter | G06F 21/10 726/26 |
| 6,009,523 | A * | 12/1999 | Owaki | G06F 21/10 726/21 |
| 6,062,474 | A * | 5/2000 | Kroll | G06K 5/00 235/379 |
| 6,078,907 | A * | 6/2000 | Lamm | G06Q 20/102 705/40 |
| 6,092,053 | A * | 7/2000 | Boesch | G06Q 10/103 705/26.8 |
| 6,105,012 | A * | 8/2000 | Chang | G06Q 20/00 380/277 |
| 6,112,240 | A * | 8/2000 | Pogue | G06F 11/3466 709/202 |
| 6,148,407 | A * | 11/2000 | Aucsmith | G06F 21/57 726/16 |
| 6,151,593 | A * | 11/2000 | Cho | G06F 21/32 706/16 |
| 6,163,604 | A * | 12/2000 | Baulier | H04M 3/36 379/189 |
| 6,163,771 | A * | 12/2000 | Walker | G06Q 20/04 705/18 |
| 6,205,436 | B1 * | 3/2001 | Rosen | G06Q 20/085 705/65 |
| 6,209,104 | B1 * | 3/2001 | Jalili | G06F 21/36 726/18 |
| 6,295,605 | B1 * | 9/2001 | Dockter | G06F 21/6218 713/166 |
| 6,327,384 | B1 * | 12/2001 | Hirao | G06K 9/3208 382/171 |
| 6,405,922 | B1 * | 6/2002 | Kroll | G06K 5/00 235/379 |
| 6,442,692 | B1 * | 8/2002 | Zilberman | G06F 21/316 713/184 |
| 6,457,021 | B1 * | 9/2002 | Berkowitz | G06F 16/2365 |
| 6,509,847 | B1 * | 1/2003 | Anderson | G06F 1/1616 178/18.01 |
| 6,523,019 | B1 * | 2/2003 | Borthwick | G06N 20/00 706/45 |
| 6,567,099 | B1 * | 5/2003 | Dawson | G06T 15/405 345/611 |
| 6,646,765 | B1 * | 11/2003 | Barker | H04N 1/38 358/1.6 |
| 6,678,666 | B1 * | 1/2004 | Boulware | G06Q 20/12 705/66 |
| 6,687,390 | B2 * | 2/2004 | Avni | G07C 9/35 382/119 |
| 6,689,055 | B1 * | 2/2004 | Mullen | G06Q 10/10 600/300 |
| 6,718,363 | B1 * | 4/2004 | Ponte | G06F 16/95 709/203 |
| 6,803,920 | B2 * | 10/2004 | Gossett | G06T 5/20 345/591 |
| 6,804,624 | B2 * | 10/2004 | Silverman | H04L 41/12 702/159 |
| 6,892,307 | B1 * | 5/2005 | Wood | G06F 21/41 713/155 |
| 6,895,507 | B1 * | 5/2005 | Teppler | H04L 9/3263 713/155 |
| 6,895,514 | B1 * | 5/2005 | Kermani | G06F 21/316 726/19 |
| 6,898,709 | B1 * | 5/2005 | Teppler | H04L 9/3263 713/178 |
| 6,908,030 | B2 * | 6/2005 | Rajasekaran | G06Q 20/02 235/379 |
| 6,937,569 | B1 * | 8/2005 | Sarkar | H04L 45/00 370/238 |
| 6,947,978 | B2 * | 9/2005 | Huffman | H04L 29/12009 370/455 |
| 6,954,532 | B1 * | 10/2005 | Handley | H04N 1/32144 380/216 |
| 6,957,339 | B2 * | 10/2005 | Shinzaki | G06F 21/34 713/186 |
| 7,002,712 | B2 * | 2/2006 | Barker | H04N 1/38 358/1.6 |
| 7,003,670 | B2 * | 2/2006 | Heaven | G06F 21/10 380/212 |
| 7,039,505 | B1 * | 5/2006 | Southard | G01S 7/003 701/3 |
| 7,039,699 | B1 * | 5/2006 | Narin | G06Q 30/02 709/207 |
| 7,043,640 | B2 * | 5/2006 | Pritchard | G06F 21/31 713/170 |
| 7,089,585 | B1 * | 8/2006 | Dharmarajan | H04L 63/0815 370/312 |
| 7,100,049 | B2 * | 8/2006 | Gasparini | G06F 21/31 713/170 |
| 7,130,858 | B2 * | 10/2006 | Ciaramitaro | G06F 16/93 |
| 7,165,051 | B2 * | 1/2007 | Ronning | G06Q 20/10 705/318 |
| 7,191,467 | B1 * | 3/2007 | Dujari | H04L 63/08 709/220 |
| 7,197,646 | B2 * | 3/2007 | Fritz | G06F 21/31 713/182 |
| 7,260,837 | B2 * | 8/2007 | Abraham | G06Q 20/3821 726/4 |
| 7,272,610 | B2 * | 9/2007 | Torres | G06F 16/93 |
| 7,272,728 | B2 * | 9/2007 | Pierson | H04L 63/0876 713/194 |
| 7,292,723 | B2 * | 11/2007 | Tedesco | A61P 29/00 382/159 |
| 7,296,088 | B1 * | 11/2007 | Padmanabhan | H04L 45/04 709/238 |
| 7,330,871 | B2 * | 2/2008 | Barber | G06Q 10/00 709/201 |
| 7,349,955 | B1 * | 3/2008 | Korb | H04L 29/06 709/219 |
| 7,363,170 | B2 * | 4/2008 | Seul | G16H 20/40 702/19 |
| 7,373,669 | B2 * | 5/2008 | Eisen | G06Q 40/02 726/26 |
| 7,401,082 | B2 * | 7/2008 | Keene | G06F 21/6245 707/785 |
| 7,428,587 | B2 * | 9/2008 | Rowland | H04L 29/12254 709/224 |
| 7,436,780 | B2 * | 10/2008 | Stephens | H04L 41/12 370/252 |
| 7,438,226 | B2 * | 10/2008 | Helsper | G06Q 30/06 235/382 |
| 7,447,494 | B2 * | 11/2008 | Law | G06Q 20/0855 455/410 |
| 7,457,823 | B2 * | 11/2008 | Shraim | H04L 51/12 |
| 7,475,242 | B2 * | 1/2009 | Baird | G06F 21/6218 713/166 |
| 7,478,182 | B2 * | 1/2009 | Schweig | G06F 3/0227 709/220 |
| 7,543,740 | B2 * | 6/2009 | Greene | G06Q 20/40 235/375 |
| 7,577,620 | B1 * | 8/2009 | Donner | G06Q 10/02 705/67 |
| 7,657,626 | B1 * | 2/2010 | Zwicky | G06Q 30/0248 709/224 |
| 7,665,658 | B2 * | 2/2010 | Fields | G06Q 20/40 235/380 |
| 7,673,793 | B2 * | 3/2010 | Greene | G06Q 20/102 235/380 |
| 7,685,629 | B1 * | 3/2010 | White | H04L 63/0838 726/2 |
| 7,708,200 | B2 * | 5/2010 | Helsper | G06Q 50/265 235/383 |
| 7,711,846 | B2 * | 5/2010 | Padmanabhan | H04L 67/18 709/238 |
| 7,739,402 | B2 * | 6/2010 | Roese | H04L 29/06 709/242 |

(56) References Cited

U.S. PATENT DOCUMENTS

| | | | | |
|---|---|---|---|---|
| 7,739,512 | B2* | 6/2010 | Hawkes | G06F 16/957 713/182 |
| 7,853,533 | B2* | 12/2010 | Eisen | G06Q 20/3674 705/64 |
| 7,908,645 | B2* | 3/2011 | Varghese | G06Q 20/341 726/4 |
| 7,933,984 | B1* | 4/2011 | Smith | G06Q 30/0203 709/224 |
| 7,945,494 | B2* | 5/2011 | Williams | G06Q 20/102 705/35 |
| 7,958,029 | B1* | 6/2011 | Bobich | G06Q 40/06 705/35 |
| 7,983,691 | B1* | 7/2011 | Wong | G01S 5/0284 455/456.1 |
| 8,037,097 | B2* | 10/2011 | Guo | H04L 61/157 707/792 |
| 8,042,164 | B2* | 10/2011 | Sheynblat | G06Q 30/0217 726/9 |
| 8,150,968 | B2* | 4/2012 | Barber | G06Q 20/3674 709/224 |
| 8,151,327 | B2* | 4/2012 | Eisen | G06Q 20/4016 726/5 |
| 8,201,099 | B1* | 6/2012 | Osbourn | G06F 8/34 715/778 |
| 8,271,891 | B1* | 9/2012 | Osbourn | G06F 3/0481 715/764 |
| 8,296,229 | B1* | 10/2012 | Yellin | G06Q 40/00 705/39 |
| 8,321,269 | B2* | 11/2012 | Linden | G06Q 30/0257 705/14.26 |
| 8,567,669 | B2* | 10/2013 | Griegel | G06Q 30/02 235/380 |
| 8,612,854 | B2* | 12/2013 | Eisen | H04N 1/32229 715/271 |
| 8,655,717 | B2* | 2/2014 | Schwarzberg | G06Q 50/22 705/14.35 |
| 8,779,981 | B2* | 7/2014 | Eisen | H04W 4/029 342/465 |
| 8,825,522 | B2* | 9/2014 | Mankoff | G06Q 30/0207 705/14.17 |
| 8,826,393 | B2* | 9/2014 | Eisen | H04L 67/02 726/5 |
| 8,838,967 | B1* | 9/2014 | Mills | H04L 63/0861 713/168 |
| 8,862,514 | B2* | 10/2014 | Eisen | G06Q 20/40 705/44 |
| 8,938,671 | B2* | 1/2015 | Eisen | G06F 21/84 715/271 |
| 9,002,934 | B1* | 4/2015 | Lunenfeld | G06Q 30/0256 709/203 |
| 9,060,012 | B2* | 6/2015 | Eisen | G06Q 20/10 |
| 9,098,617 | B1* | 8/2015 | Pauley, Jr. | G06Q 10/06 |
| 9,112,850 | B1* | 8/2015 | Eisen | H04L 63/1408 |
| 9,118,646 | B2* | 8/2015 | Pierson | H04L 63/08 |
| 9,196,004 | B2* | 11/2015 | Eisen | H04L 63/08 |
| 9,298,677 | B2* | 3/2016 | Tollinger | G06Q 30/0226 |
| 9,361,597 | B2* | 6/2016 | Britton | G06Q 20/4016 |
| 9,524,510 | B2* | 12/2016 | Rajan | G06Q 20/0225 |
| 9,529,938 | B2* | 12/2016 | Woodward | G06F 16/907 |
| 9,558,507 | B2* | 1/2017 | Zilkha | G06Q 30/0257 |
| 9,679,311 | B2* | 6/2017 | Igelman | H04W 4/029 |
| 9,710,821 | B2* | 7/2017 | Heath | G06Q 30/02 |
| 9,754,256 | B2* | 9/2017 | Britton | G06Q 10/0635 |
| 9,785,973 | B2* | 10/2017 | Tollinger | G06Q 30/0235 |
| 9,948,629 | B2* | 4/2018 | Eisen | H04L 63/1483 |
| 9,990,631 | B2* | 6/2018 | Eisen | G06Q 20/4016 |
| 10,021,099 | B2* | 7/2018 | Eisen | G06F 21/73 |
| 10,089,679 | B2* | 10/2018 | Eisen | G06Q 20/4016 |
| 10,091,312 | B1* | 10/2018 | Khanwalkar | H04L 67/22 |
| 10,127,564 | B2* | 11/2018 | Heath | G06Q 30/02 |
| 10,341,344 | B2* | 7/2019 | Eisen | G06F 21/73 |
| 10,354,258 | B2* | 7/2019 | Marovets | G06Q 30/02 |
| 10,395,252 | B2* | 8/2019 | Eisen | G06Q 20/4016 |
| 10,417,637 | B2* | 9/2019 | Eisen | G06Q 20/4016 |
| 10,453,066 | B2* | 10/2019 | Eisen | G06Q 40/00 |
| 10,535,093 | B2* | 1/2020 | Eisen | H04L 63/1466 |
| 10,594,685 | B2* | 3/2020 | Peddada | G06F 21/31 |
| 10,616,201 | B2* | 4/2020 | Eisen | H04L 63/1408 |
| 10,628,854 | B2* | 4/2020 | Tollinger | G06F 40/106 |
| 10,699,283 | B2* | 6/2020 | Marovets | G06Q 30/02 |
| 10,726,151 | B2* | 7/2020 | Eisen | G06F 21/6245 |
| 10,728,350 | B1* | 7/2020 | Khanwalkar | H04L 67/306 |
| 2001/0011243 | A1* | 8/2001 | Dembo | G06Q 40/08 705/36 R |
| 2001/0011304 | A1* | 8/2001 | Wesinger, Jr. | H04L 61/2521 709/227 |
| 2001/0016840 | A1* | 8/2001 | Hijikata | G06F 16/9577 |
| 2001/0016876 | A1* | 8/2001 | Kurth | H04L 43/0858 709/223 |
| 2001/0034712 | A1* | 10/2001 | Colvin | G06F 21/121 705/52 |
| 2001/0046096 | A1* | 11/2001 | Worden | G11B 27/031 360/13 |
| 2002/0035622 | A1* | 3/2002 | Barber | G06Q 40/12 709/220 |
| 2002/0041328 | A1* | 4/2002 | LeCompte | G01C 11/025 348/144 |
| 2002/0056042 | A1* | 5/2002 | van der Kaay | H04L 63/0823 713/178 |
| 2002/0073046 | A1* | 6/2002 | David | G06Q 20/12 705/67 |
| 2002/0073327 | A1* | 6/2002 | Vellandi | G06F 21/10 713/193 |
| 2002/0083079 | A1* | 6/2002 | Meier | G06F 16/93 |
| 2002/0112171 | A1* | 8/2002 | Ginter | G06Q 20/085 713/185 |
| 2002/0153424 | A1* | 10/2002 | Li | G06K 19/06206 235/492 |
| 2002/0156836 | A1* | 10/2002 | Janosik, Jr. | H04L 67/2819 709/203 |
| 2002/0166063 | A1* | 11/2002 | Lachman, III | H04L 63/1458 726/23 |
| 2002/0167965 | A1* | 11/2002 | Beasley | H04W 36/0033 370/465 |
| 2003/0002732 | A1* | 1/2003 | Gossett | G06T 5/20 382/164 |
| 2003/0002740 | A1* | 1/2003 | Melikian | G06T 7/001 382/217 |
| 2003/0033161 | A1* | 2/2003 | Walker | G06Q 30/02 705/1.1 |
| 2003/0033356 | A1* | 2/2003 | Tran | H04L 67/306 709/203 |
| 2003/0070080 | A1* | 4/2003 | Rosen | G06Q 20/06 713/187 |
| 2003/0076242 | A1* | 4/2003 | Burns | G01D 4/004 340/870.02 |
| 2003/0105854 | A1* | 6/2003 | Thorsteinsson | G06F 9/542 709/223 |
| 2003/0115334 | A1* | 6/2003 | Bhat | G06Q 30/06 709/227 |
| 2003/0115481 | A1* | 6/2003 | Baird | G06F 21/6218 726/4 |
| 2003/0140258 | A1* | 7/2003 | Nelson | G06F 21/46 726/6 |
| 2003/0154214 | A1* | 8/2003 | Tu | G06Q 10/08 |
| 2003/0163413 | A1* | 8/2003 | Wiczkowski | G06Q 20/02 705/38 |
| 2003/0172036 | A1* | 9/2003 | Feigenbaum | G07F 7/1083 705/64 |
| 2003/0182551 | A1* | 9/2003 | Frantz | G06F 21/41 713/170 |
| 2003/0208684 | A1* | 11/2003 | Camacho | G06Q 20/401 713/186 |
| 2003/0233553 | A1* | 12/2003 | Parks | G06F 21/725 713/178 |
| 2004/0001044 | A1* | 1/2004 | Luciani, Jr. | G06F 3/04812 345/157 |
| 2004/0004733 | A1* | 1/2004 | Barker | H04N 1/38 358/1.13 |

(56) References Cited

U.S. PATENT DOCUMENTS

| | | | |
|---|---|---|---|
| 2004/0006553 A1* | 1/2004 | de Vries | G16H 80/00 |
| 2004/0027385 A1* | 2/2004 | Rekimoto | G06F 1/163 |
| | | | 715/773 |
| 2004/0030912 A1* | 2/2004 | Merkle, Jr. | G06F 12/08 |
| | | | 726/26 |
| 2004/0034794 A1* | 2/2004 | Mayer | G06F 21/567 |
| | | | 726/23 |
| 2004/0073809 A1* | 4/2004 | Wing Keong | G06F 21/36 |
| | | | 726/7 |
| 2004/0088313 A1* | 5/2004 | Torres | G06F 16/93 |
| 2004/0105431 A1* | 6/2004 | Monjas-Llorente | |
| | | | H04L 63/1458 |
| | | | 370/352 |
| 2004/0117321 A1* | 6/2004 | Sancho | G06Q 20/3821 |
| | | | 705/76 |
| 2004/0166857 A1* | 8/2004 | Shim | H04W 12/10 |
| | | | 455/436 |
| 2004/0181598 A1* | 9/2004 | Paya | G06F 16/9574 |
| | | | 709/227 |
| 2004/0203750 A1* | 10/2004 | Cowdrey | H04M 15/47 |
| | | | 455/432.1 |
| 2004/0236696 A1* | 11/2004 | Aoki | G06Q 20/403 |
| | | | 705/50 |
| 2004/0236702 A1* | 11/2004 | Fink | H04W 12/12 |
| | | | 705/73 |
| 2004/0254890 A1* | 12/2004 | Sancho | G07C 9/37 |
| | | | 705/67 |
| 2004/0260876 A1* | 12/2004 | Singh | G06Q 10/10 |
| | | | 711/117 |
| 2005/0008148 A1* | 1/2005 | Jacobson | G06F 3/038 |
| | | | 380/26 |
| 2005/0022020 A1* | 1/2005 | Fremberg | H04L 63/083 |
| | | | 726/4 |
| 2005/0033653 A1* | 2/2005 | Eisenberg | G06Q 30/06 |
| | | | 705/26.8 |
| 2005/0033703 A1* | 2/2005 | Holdsworth | G06Q 20/3821 |
| | | | 705/67 |
| 2005/0039034 A1* | 2/2005 | Doyle | H04L 9/3263 |
| | | | 713/193 |
| 2005/0039219 A1* | 2/2005 | Cooper | H04N 21/42204 |
| | | | 725/134 |
| 2005/0076230 A1* | 4/2005 | Redenbaugh | H04L 63/1441 |
| | | | 726/26 |
| 2005/0097320 A1* | 5/2005 | Golan | G06F 21/40 |
| | | | 713/166 |
| 2005/0108177 A1* | 5/2005 | Sancho | G06Q 20/02 |
| | | | 705/64 |
| 2005/0111054 A1* | 5/2005 | Umeda | H04N 1/32117 |
| | | | 358/453 |
| 2005/0113092 A1* | 5/2005 | Coppinger | H04L 67/2823 |
| | | | 455/436 |
| 2005/0131826 A1* | 6/2005 | Cook | G06Q 20/4012 |
| | | | 705/44 |
| 2005/0154676 A1* | 7/2005 | Ronning | G06Q 30/0601 |
| | | | 705/44 |
| 2005/0185225 A1* | 8/2005 | Brawn | H04N 1/00403 |
| | | | 358/401 |
| 2005/0188423 A1* | 8/2005 | Motsinger | H04L 67/22 |
| | | | 726/22 |
| 2005/0216278 A1* | 9/2005 | Eisen | G06Q 20/4016 |
| | | | 705/35 |
| 2005/0246551 A1* | 11/2005 | Dondl | G06F 21/6209 |
| | | | 713/189 |
| 2005/0278542 A1* | 12/2005 | Pierson | H04L 63/0876 |
| | | | 713/182 |
| 2006/0008779 A1* | 1/2006 | Shand | G09B 19/00 |
| | | | 434/90 |
| 2006/0010072 A1* | 1/2006 | Eisen | G06Q 20/4016 |
| | | | 705/44 |
| 2006/0026669 A1* | 2/2006 | Zakas | H04L 29/06 |
| | | | 726/6 |
| 2006/0048211 A1* | 3/2006 | Pierson | H04L 63/0876 |
| | | | 726/3 |
| 2006/0126829 A1* | 6/2006 | Lai | G09C 5/00 |
| | | | 380/28 |
| 2006/0130132 A1* | 6/2006 | Dharmarajan | H04L 63/0428 |
| | | | 726/10 |
| 2006/0136294 A1* | 6/2006 | Linden | G06Q 30/0257 |
| | | | 705/14.47 |
| 2006/0155985 A1* | 7/2006 | Canard | G06Q 20/383 |
| | | | 713/156 |
| 2006/0161501 A1* | 7/2006 | Waserstein | G06Q 20/382 |
| | | | 705/65 |
| 2006/0190330 A1* | 8/2006 | Tollinger | G06Q 30/0226 |
| | | | 705/14.14 |
| 2006/0190331 A1* | 8/2006 | Tollinger | G06F 40/106 |
| | | | 705/14.14 |
| 2006/0200855 A1* | 9/2006 | Willis | H04L 9/3271 |
| | | | 726/2 |
| 2006/0200856 A1* | 9/2006 | Salowey | H04L 9/32 |
| | | | 726/5 |
| 2006/0224898 A1* | 10/2006 | Ahmed | G06F 21/316 |
| | | | 713/186 |
| 2006/0264202 A1* | 11/2006 | Hagmeier | H04L 67/02 |
| | | | 455/411 |
| 2006/0281541 A1* | 12/2006 | Nguyen | G07F 17/32 |
| | | | 463/25 |
| 2006/0282660 A1* | 12/2006 | Varghese | G07F 7/1041 |
| | | | 713/155 |
| 2006/0284838 A1* | 12/2006 | Tsatalos | G06Q 10/0637 |
| | | | 345/156 |
| 2006/0287902 A1* | 12/2006 | Helsper | G06Q 30/06 |
| | | | 235/382 |
| 2007/0011078 A1* | 1/2007 | Jain | G06Q 40/04 |
| | | | 705/37 |
| 2007/0038568 A1* | 2/2007 | Greene | G06Q 50/188 |
| | | | 705/50 |
| 2007/0043837 A1* | 2/2007 | Kruse | G06F 16/9577 |
| | | | 709/220 |
| 2007/0061211 A1* | 3/2007 | Ramer | G06Q 20/12 |
| | | | 705/25 |
| 2007/0073630 A1* | 3/2007 | Greene | G06Q 20/102 |
| | | | 705/80 |
| 2007/0094594 A1* | 4/2007 | Matichuk | G06F 40/253 |
| | | | 715/205 |
| 2007/0097076 A1* | 5/2007 | Gross | G06F 21/31 |
| | | | 345/163 |
| 2007/0097976 A1* | 5/2007 | Wood | H04L 63/1416 |
| | | | 370/392 |
| 2007/0101405 A1* | 5/2007 | Engle | H04L 63/0272 |
| | | | 726/4 |
| 2007/0107059 A1* | 5/2007 | Chasin | H04L 63/14 |
| | | | 726/23 |
| 2007/0124246 A1* | 5/2007 | Lawyer | H04M 15/00 |
| | | | 705/50 |
| 2007/0162763 A1* | 7/2007 | Bender | G06F 21/316 |
| | | | 713/186 |
| 2007/0199054 A1* | 8/2007 | Florencio | H04L 63/1441 |
| | | | 726/5 |
| 2007/0204044 A1* | 8/2007 | Rice | H04L 63/08 |
| | | | 709/225 |
| 2007/0220594 A1* | 9/2007 | Tulsyan | G06F 21/31 |
| | | | 726/5 |
| 2007/0233599 A1* | 10/2007 | Ganesan | G06Q 20/24 |
| | | | 705/40 |
| 2007/0234070 A1* | 10/2007 | Horning | G06F 21/14 |
| | | | 713/190 |
| 2007/0234409 A1* | 10/2007 | Eisen | H04L 67/02 |
| | | | 726/6 |
| 2007/0239604 A1* | 10/2007 | O'Connell | G06Q 20/4016 |
| | | | 705/50 |
| 2007/0239606 A1* | 10/2007 | Eisen | G06Q 20/3674 |
| | | | 705/51 |
| 2007/0255821 A1* | 11/2007 | Ge | G06Q 10/00 |
| | | | 709/224 |
| 2007/0271466 A1* | 11/2007 | Mak | G06F 21/316 |
| | | | 713/184 |

(56) References Cited

U.S. PATENT DOCUMENTS

| | | | | |
|---|---|---|---|---|
| 2007/0294401 A1* | 12/2007 | Shkedi | G06Q 30/0269 | 709/224 |
| 2008/0005394 A1* | 1/2008 | Crooks | H04L 63/1408 | 710/33 |
| 2008/0010367 A1* | 1/2008 | Chen | G01S 5/0289 | 709/223 |
| 2008/0010678 A1* | 1/2008 | Burdette | G06Q 30/0603 | 726/15 |
| 2008/0021801 A1* | 1/2008 | Song | G06Q 40/02 | 705/35 |
| 2008/0040802 A1* | 2/2008 | Pierson | H04L 63/0876 | 726/22 |
| 2008/0046562 A1* | 2/2008 | Butler | G06F 16/958 | 709/224 |
| 2008/0052629 A1* | 2/2008 | Phillips | G06Q 30/02 | 705/318 |
| 2008/0098222 A1* | 4/2008 | Zilberman | G06F 21/83 | 713/170 |
| 2008/0101277 A1* | 5/2008 | Taylor | G01S 5/0289 | 370/328 |
| 2008/0104672 A1* | 5/2008 | Lunde | H04L 63/1441 | 726/3 |
| 2008/0104684 A1* | 5/2008 | Lunde | H04L 63/126 | 726/6 |
| 2008/0133420 A1* | 6/2008 | Barber | H04L 67/303 | 705/75 |
| 2008/0162200 A1* | 7/2008 | O'Sullivan | G06Q 30/04 | 705/34 |
| 2008/0162202 A1* | 7/2008 | Khanna | G06Q 20/10 | 705/14.47 |
| 2008/0162475 A1* | 7/2008 | Meggs | G06Q 30/02 | |
| 2008/0163128 A1* | 7/2008 | Callanan | G06Q 30/02 | 715/856 |
| 2008/0184372 A1* | 7/2008 | Hoshina | G06F 21/564 | 726/24 |
| 2008/0189790 A1* | 8/2008 | Park | G06F 21/83 | 726/26 |
| 2008/0201214 A1* | 8/2008 | Aaron | H04M 15/8033 | 705/14.47 |
| 2008/0204788 A1* | 8/2008 | Kelly | G06T 11/60 | 358/1.15 |
| 2008/0222706 A1* | 9/2008 | Renaud | H04L 63/1408 | 726/4 |
| 2008/0281606 A1* | 11/2008 | Kitts | G06Q 30/02 | 705/1.1 |
| 2008/0301281 A1* | 12/2008 | Wang | H04L 63/1416 | 709/224 |
| 2008/0319774 A1* | 12/2008 | O'Sullivan | G06Q 30/0248 | 705/300 |
| 2009/0024971 A1* | 1/2009 | Willner | G06Q 30/0248 | 716/106 |
| 2009/0037213 A1* | 2/2009 | Eisen | G06Q 20/40 | 705/318 |
| 2009/0044282 A1* | 2/2009 | Govindaraju | G07C 9/33 | 726/27 |
| 2009/0076903 A1* | 3/2009 | Schwarzberg | G16H 20/30 | 705/14.19 |
| 2009/0076912 A1* | 3/2009 | Rajan | G06Q 30/0273 | 705/14.64 |
| 2009/0083184 A1* | 3/2009 | Eisen | G06Q 20/10 | 705/50 |
| 2009/0089869 A1* | 4/2009 | Varghese | G06Q 20/4014 | 726/7 |
| 2009/0106413 A1* | 4/2009 | Salo | G06F 21/552 | 709/224 |
| 2009/0157417 A1* | 6/2009 | Bradley | G06Q 30/02 | 705/318 |
| 2009/0164269 A1* | 6/2009 | Gupta | G06F 21/552 | 705/14.47 |
| 2009/0177692 A1* | 7/2009 | Chagoly | H04L 41/0631 | |
| 2009/0222308 A1* | 9/2009 | Zoldi | G06Q 20/4016 | 705/38 |
| 2009/0228585 A1* | 9/2009 | Kosbab | H04L 43/18 | 709/224 |
| 2009/0241174 A1* | 9/2009 | Rajan | G06F 21/31 | 726/5 |
| 2009/0280777 A1* | 11/2009 | Doherty | H04W 12/1206 | 455/411 |
| 2009/0292568 A1* | 11/2009 | Khosravani | G06Q 40/02 | 705/7.28 |
| 2009/0307119 A1* | 12/2009 | Ahles | G06Q 20/4016 | 705/35 |
| 2010/0004965 A1* | 1/2010 | Eisen | G06Q 30/0601 | 705/318 |
| 2010/0005013 A1* | 1/2010 | Uriarte | G06Q 30/06 | 705/30 |
| 2010/0070606 A1* | 3/2010 | Shenfield | H04L 67/327 | 709/217 |
| 2010/0138299 A1* | 6/2010 | Preston | G06Q 30/0242 | 705/14.53 |
| 2010/0138303 A1* | 6/2010 | Preston | G06Q 30/0212 | 705/14.64 |
| 2010/0153540 A1* | 6/2010 | Li | H04L 41/12 | 709/224 |
| 2010/0169192 A1* | 7/2010 | Zoldi | G06Q 40/12 | 705/30 |
| 2010/0293094 A1* | 11/2010 | Kolkowitz | G06Q 20/401 | 705/44 |
| 2010/0321296 A1* | 12/2010 | Gross | G06F 21/83 | 345/163 |
| 2010/0333170 A1* | 12/2010 | Cox | G06F 3/03543 | 726/1 |
| 2011/0082768 A1* | 4/2011 | Eisen | H04L 63/1483 | 705/26.35 |
| 2011/0113388 A1* | 5/2011 | Eisen | G06F 21/32 | 715/856 |
| 2011/0161228 A1* | 6/2011 | Suzuki | G06Q 20/349 | 705/40 |
| 2011/0184778 A1* | 7/2011 | Graepel | G06Q 10/00 | 705/7.31 |
| 2011/0270618 A1* | 11/2011 | Banerjee | G06Q 40/02 | 705/1.1 |
| 2011/0288932 A1* | 11/2011 | Marks | G06Q 30/0241 | 705/14.49 |
| 2012/0096557 A1* | 4/2012 | Britton | G06Q 20/4016 | 726/25 |
| 2012/0174223 A1* | 7/2012 | Eisen | G06Q 30/0635 | 726/23 |
| 2012/0190386 A1* | 7/2012 | Anderson | G01S 19/14 | 455/456.3 |
| 2012/0233665 A1* | 9/2012 | Ranganathan | G06F 21/51 | 726/4 |
| 2012/0239574 A1* | 9/2012 | Smith | G06Q 20/4014 | 705/44 |
| 2012/0239774 A1* | 9/2012 | Tola | H04L 67/1021 | 709/213 |
| 2012/0290412 A1* | 11/2012 | Marovets | G06Q 30/02 | 705/14.73 |
| 2012/0323788 A1* | 12/2012 | Keresman, III | G07F 7/10 | 705/44 |
| 2012/0323836 A1* | 12/2012 | Wright | G06F 40/30 | 706/46 |
| 2013/0024300 A1* | 1/2013 | Choudhuri | G06Q 30/018 | 705/16 |
| 2013/0024371 A1* | 1/2013 | Hariramani | G06Q 20/36 | 705/41 |
| 2013/0036304 A1* | 2/2013 | Lin | H04W 4/21 | 713/168 |
| 2013/0066717 A1* | 3/2013 | Marovets | G06Q 30/02 | 705/14.49 |
| 2013/0073388 A1* | 3/2013 | Heath | G06Q 30/02 | 705/14.53 |
| 2013/0085823 A1* | 4/2013 | Gibson | G06Q 30/02 | 705/14.5 |
| 2013/0097673 A1* | 4/2013 | Meehan | G07F 7/1008 | 726/4 |
| 2013/0110603 A1* | 5/2013 | Chi | G06Q 20/3274 | 705/14.23 |

(56) References Cited

U.S. PATENT DOCUMENTS

| | | | |
|---|---|---|---|
| 2013/0144539 A1* | 6/2013 | Allen | C12Q 1/6813 702/19 |
| 2013/0173753 A1* | 7/2013 | Marovets | G07C 13/00 709/219 |
| 2013/0185764 A1* | 7/2013 | Krstic | G06F 16/122 726/2 |
| 2013/0197998 A1* | 8/2013 | Buhrmann | G06Q 20/4016 705/14.53 |
| 2013/0273879 A1* | 10/2013 | Eisen | H04W 12/0609 455/405 |
| 2014/0006129 A1* | 1/2014 | Heath | G06Q 30/0222 705/14.23 |
| 2014/0120864 A1* | 5/2014 | Manolarakis | G06Q 30/0251 455/405 |
| 2014/0122343 A1* | 5/2014 | Einav | G06F 21/554 705/67 |
| 2014/0164013 A1* | 6/2014 | Schwarzberg | G06F 19/3475 705/2 |
| 2014/0249905 A1* | 9/2014 | Mehler | G06Q 30/0238 705/14.23 |
| 2014/0361926 A1* | 12/2014 | Eisen | H04W 4/029 342/450 |
| 2015/0106270 A1* | 4/2015 | Burrell | G06Q 20/4014 705/44 |
| 2015/0205978 A1* | 7/2015 | Eisen | G06F 40/166 726/27 |
| 2015/0215373 A1* | 7/2015 | Marovets | G06F 3/0484 715/719 |
| 2015/0221019 A1* | 8/2015 | Eisen | H04L 63/1466 705/26.81 |
| 2015/0294316 A1* | 10/2015 | Eisen | G06Q 40/12 705/30 |
| 2016/0019546 A1* | 1/2016 | Eisen | G06F 21/44 705/44 |
| 2016/0021084 A1* | 1/2016 | Eisen | H04L 63/0807 726/7 |
| 2016/0034954 A1* | 2/2016 | Tollinger | G06Q 30/0261 705/14.53 |
| 2016/0232560 A1* | 8/2016 | VanDeVelde | G06Q 30/0238 |
| 2016/0321701 A1* | 11/2016 | Tollinger | G06Q 30/0277 |
| 2017/0076311 A1* | 3/2017 | Rajan | G06Q 30/0225 |
| 2018/0005259 A1* | 1/2018 | Nair | G06F 12/0253 |

OTHER PUBLICATIONS

Grier (2005).*
Hayles (2005).*
Mindell (2015).*
Treffert (2010).*
Full List of References Cited but Not Relied Upon.*

* cited by examiner

AUTOMATICALLY AGGREGATING, EVALUATING, AND PROVIDING A CONTEXTUALLY RELEVANT OFFER

BACKGROUND

Often, a customer will receive offers, rewards, coupons, and/or shopping incentives from the same retailer across a number of different platforms. It can be overwhelming for the customer to sort the offers, or even be aware of one or more of the different offers. For example, the customer could redeem an offer for a given purchase only to find out later that the offer they redeemed was not the best offer available to them. Maybe, the customer missed the best available offer because they did not see or check a particular communication channel. As such, instead of the customer feeling the joy at using the redeemed offer to make the purchase, the customer may feel that they were cheated, betrayed, or that the purchase is otherwise tainted. This feeling of hostility could result in detriment toward the offer provider, the seller, or even the purchased merchandise; instead of the intended goal of customer appreciation and good-will.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DESCRIPTION OF EMBODIMENTS

Figure 1:
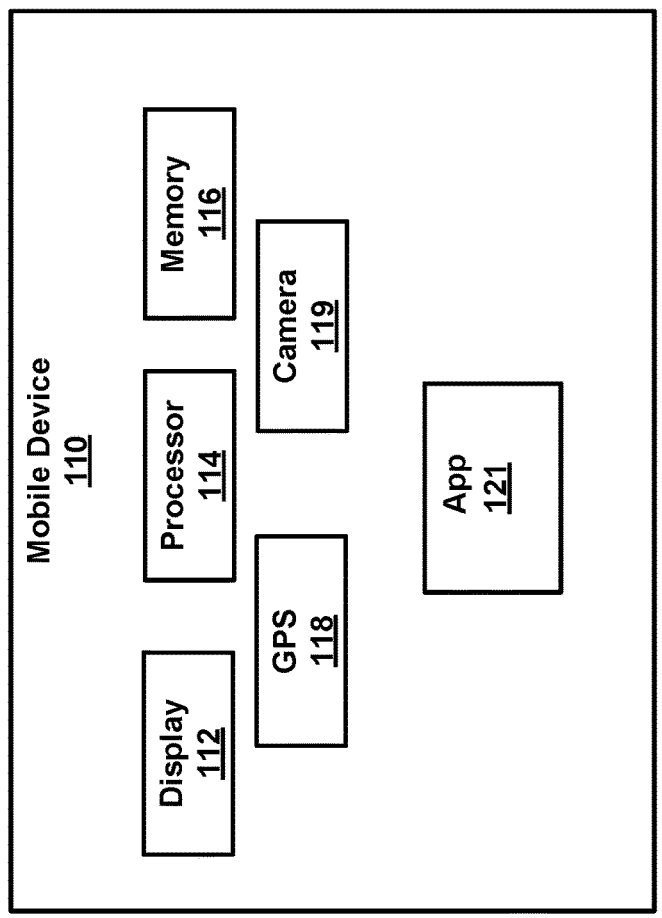
FIG. 1 is a block diagram of a mobile device, in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "correlating", "prescreening", "developing", "presenting", "deploying" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

In the following discussion, the term "retailer" is used to define a company or conglomeration that includes one or more brands. The term "brand" refers to a specific section of the retailer that includes a number of stores. The term "store" refers to a single sales location, a store could be a physical store (e.g., brick and mortar) or it could be a virtual store (e.g., a location that is accessed via the web).

It should also be appreciated that the obtaining or accessing of the customer's information and/or features of the customer's mobile device conform to applicable privacy laws (e.g., federal privacy laws, state privacy laws, etc.). In one embodiment, prior to accessing any customer information, the customer affirmatively "opts-in" to the services described herein. As a result, any information is obtained with the customer's prior permission. Moreover, depending on present or future requirements, rules and regulations, aspects described herein may be more or less formal.

Often a customer will receive offers, rewards, coupons, and/or shopping incentives from the same retailer across different social platforms. In the following discussion, an offer may be different than a reward, which may be different than a coupon which also may be different than an incentive. For example, in the following discussion, an offer drives a customer to make a purchase at a specific store and obtain the discount at the time the offer is used, e.g., buy 1 get 1, etc.; A reward is a discount received by a customer after they have made a purchase, e.g., your purchase has qualified you for $0.20 off each gallon of gas at your next fill-up, etc.; A coupon drives a customer to make a purchase of a specific item and obtain the discount at time of purchase when the coupon is used e.g., $1 off a bag of chips, etc.; A shopping incentive drives a customer to spend a certain amount at a specific store and obtain a discount at the time of purchase, the amount of the discount being directly related to the amount of money spent at the specific store e.g., 5% off of $50, 10% off of $500, etc.

Although the offer, reward, coupon and incentive are each different, they are, as a whole, similar in nature. The goal of each is to promote customer loyalty, repeat business, good will, etc. As such, and for purposes of clarity in the following discussion, they will all be referred to in the following examples as offers. Thus, the term "offer" as used herein could refer to an offer, a reward, a coupon, a shopping incentive, or the like.

Overview

In general, a customer can receive a number of different offers over a number of different channels. For example, a first emailed offer, a second offer on a Facebook post, a third offer in an Instagram offer, a fourth offer on a printed coupon provided at a time of check-out, a fifth offer received via direct mail, a etc. It can be overwhelming for the customer to sort the offers, or even be aware of one or more of the different offers. As such, the customer could redeem an offer (e.g., the emailed offer) for a given purchase only to find out later that the offer they redeemed (the emailed offer) was not as good as the offer they had received via another platform (e.g., the Instagram offer, the direct mail offer, etc.). Fundamentally, it is very easy for a customer to miss their best offer because they did not see/did not check a particular communication channel, which contained an offer better than the offer that the customer actually used.

By using the contextually relevant offer determiner disclosed herein, all of the offers that are provided across the customer's various social media platforms, any images of paper offers that are captured by the customer's mobile device, and the like are collected, evaluated, and organized in a best offer, next best offer, etc. format.

In one embodiment, the contextually relevant offer determiner could also search the Internet, the store's digitized mailers, images of a paper offer (e.g., a paper offer provided at a POS, an offer on a paper receipt, a direct mail offer, etc.) that are captured by the customer's mobile device, and the like to obtain any generic (e.g., not customer specific) offers. The contextually relevant offer determiner would aggregate the generic offers in combination with the customer received offers and then evaluate and organize all of the available offers in a best offer, next best offer, etc. format.

In one embodiment, the contextually relevant offer determiner would also utilize location information (GPS, etc.) about a customer mobile device to search for any location specific offers that are available. The contextually relevant offer determiner could aggregate any location specific offers in combination with the customer received offers (and, in one embodiment, any generic offers) and then evaluate and organize the all of the available offers into a best offer, next best offer, etc. format.

In so doing, when the customer goes to redeem an offer during the payment portion of the transaction, the contextually relevant offer determiner will ensure that the customer will be redeeming the best offer that is available to them for that particular purchase.

As such, no better offer would later be found by the customer and there would be no opportunity for an overlooked offer to cause ill will between the customer and the purchase.

However, it should be appreciated that the best offer is not necessarily the biggest money saving offer. In one embodiment, the evaluating and organizing of the offers by the contextually relevant offer determiner could evaluate the plurality of offers for the best value for a specific customer. For example, if a specific customer prefers a percentage off then, in one embodiment, the offers would be sorted so that the offer with the highest percentage off would be the best offer presented to the customer. In contrast, if the customer prefers cash back then, in one embodiment, the offers would be sorted so that the highest cash back offer would be the first best offer presented to the customer.

Importantly, the embodiments of the present invention, as will be described below, provide an approach for automatically determining the best contextually relevant offer which differs significantly from the conventional processes used to apply an offer at a time of purchase. In conventional approaches, the offer was provided on a piece of paper that was handed to the cashier by the customer at the point-of-sale (POS). As such, it was easy for the customer to know which coupons they had available (e.g., remembered to bring along) at the time of purchase. For example, the customer would cut the coupons, sort them and them store them in their purse to be used the next time the customer was at the store where the coupon could be redeemed. However, the conventional approach was full of missed expiration dates, delays and pressure felt by the customer during searches through tens or hundreds of coupons at the POS, and the like. Moreover, the old way of managing offers is not compatible with the electronic age. In contrast, an Internet-centric electronic offer can be obtained from a customer's social media platforms, at a store, from a website, via a mobile application, and the like. Moreover, the Internet-centric electronic offer is not limited to when it can be received. The customer is likely to receive an electronic offer over social media, from a website, or the like at almost any time. The ability for the customer to maintain, track, and sort the numerous offers available at all different times in the Internet-centric world is an impossible task.

Moreover, since the electronic offer can now be provided to the customer over numerous different platforms, at almost any time, and could include multiple different variations, values, obligations, fine print, limited uses, double reward periods, and the like, the pre-Internet ability to sort and utilize offers cannot be simply adjusted to use on a computing device or handled over a network. Instead, the use of electronic offer requires a completely new and different system than that which was used prior to the Internet-centric world. Moreover, as the number of platforms providing electronic offers grow, the solution described herein is different than even electronic offer characteristics of even a few years ago. For example, in days past, the electronic offer would include a feature that limited the offer from being copied, shared, or the like to protect the offer provider's liability. As such, the offer provider knew what the liability was and the customer knew the offer was available. However, now, with the advent of electronic offers being provided over social media platforms and the like, the electronic offers have taken on previously unknown aspects such as "this offer is good only for the first 500 redeeming customers", expiration times in the minutes or hours instead of days or weeks, and the like, that are completely network-centric. For example, the customer could have and expect to use an electronic offer only to find out that it has expired, has been replaced, or is otherwise no longer available and the customer is then left with a product, an intent to purchase at least partially driven by the electronic offer, and no electronic offer.

Thus, embodiments of the present invention provide a contextually relevant offer determiner that is completely different than what was previously done because of the Internet-centric aspect of the contextually relevant offer determiner application. For example, the contextually relevant offer determiner can be accessing, sorting, and evaluating offers received from the plurality of different platforms throughout the shopping experience all the way up to the time the transaction is made. Moreover, the contextually relevant offer determiner can continue to search and evaluate the different platforms even at times that would not be convenient or even possible for a customer. For example, the customer would not be constantly searching for offers while eating at a restaurant, in the middle of a date, business meeting, family outing, etc. Similarly, the customer would not be able to search and evaluate while they are loading their groceries onto the conveyor at the checkout, etc. In other words, there is no way the old methodology of coupon cutting, sorting, and evaluating can be used in the modern net-centric world of electronic offers as discussed herein.

Even the best offer user would not be able to (or should not for safety's sake) search their mobile device while they are driving. As such, if the customer was on the way to do some shopping at REI and a competitor had provided an offer, via Instagram, for shopping at camp city, the customer would not be able to identify the new offer until they had arrived at the REI. At that time, if the customer did identify the offer, they would have to evaluate whether or not it is worth the extra gas, time, etc. to make the trip to the other store. In contrast, the contextually relevant offer determiner App on the customer's mobile device could provide an oral alert about the freshly obtained offer. For example, the app could use the speaker on the mobile device to announce the offer, use the customer's car connectivity to announce the receipt of the new offer, etc.

As such, the present technology, the various embodiments of the present invention do not merely implement conventional gathering and sorting processes on a computer. Moreover, the various embodiments of the present invention, in part, provide a previously unknown, unavailable, and unnecessary procedure for providing real-time updates, evaluations, and utilization of a received offer if the received offer is the best offer according to the contextually relevant offer determiner. In so doing, embodiments provide a consistent, up-to-date, real-time best offer capability. Hence, embodiments of the present invention provide a novel process for determining the best offer to use via an electronic application which is necessarily rooted in Internet-centric computer technology to overcome a problem specifically arising in the realm of Internet based offers across a plurality of different platforms.

Moreover, the embodiments do not recite a mathematical algorithm; nor do they recite a fundamental economic or longstanding commercial practice. Instead, they address a business challenge that has been born in the Internet-centric environment of best offer analysis, determination, and utilization. Thus, the embodiments do not "merely recite the performance of some business practice known from the pre-Internet world along with the requirement to perform it on the Internet." Instead, the embodiments are necessarily rooted in network-centric environments in order to overcome a problem specifically arising in the realm of random offer reception across a plurality of different digital platforms, applications, and the like.

Operation

Referring now to FIG. 1, a block diagram of a mobile device 110 is shown. Although a number of components are shown as part of mobile device 110, it should be appreciated that other, different, more, or fewer components may be found on mobile device 110.

In general, mobile device 110 is an example of a customer's mobile device, a store's mobile device, an associate's mobile device, or the like. Mobile device 110 could be a mobile phone, a smart phone, a tablet, a smart watch, a piece of smart jewelry, smart glasses, or other user portable devices having wireless connectivity. For example, mobile device 110 would be capable of broadcasting and receiving via at least one network, such as, but not limited to, WiFi, Cellular, Bluetooth, NFC, and the like. In one embodiment, mobile device 110 includes a display 112, a processor 114, a memory 116, a GPS 118, a camera 119, a contextually relevant offer determiner Application (e.g., App 121), and the like. In one embodiment, instead of providing GPS information, the location of mobile device 110 may be determined within a given radius, such as the broadcast range of an identified beacon, a WiFi hotspot, overlapped area covered by a plurality of mobile telephone signal providers, or the like. Mobile device 110 can include one or more of the components described in detail in the description of FIG. 5.

In one embodiment, location information for mobile device 110 could be obtained from GPS 118. In another embodiment, location information for mobile device 110 could be obtained by a device separate from mobile device 110. For example, location information 311 could be obtained by systems such as, but not limited to, a geo-fence, a node (e.g., a beacon, WiFi node, an RFID node, a mobile phone provider node), an address, a lat-long, or the like.

In another example, a cellular network could be used to provide the location information 311. E.g., the customer's mobile device was within range of cell tower A31D6, and cell tower A31D6 has a ½ mile range. Then the ½ mile radius of cell tower A31D6 would be the location information 311.

For example, in one embodiment, mobile device 110 (or an application operating thereon) will be enabled to look for the transmission of one or more of beacons, nodes, etc. When mobile device 110 is within physical proximity to the beacon and detects it, the application can obtain location information or beacon identification information. In one embodiment, the node MAC address (device IP address, etc.) is used to determine the location of the mobile device 110.

In one embodiment, an area of interest can be monitored such that it can be determined if a mobile device 110 enters into the area of interest. This determination may be made by, but is not limited to: a pinging of mobile device 110, a push or pull interaction with a beacon, a location broadcast from mobile device 110, a location broadcast from an app, such as a store's application, operating on mobile device 110, mobile device 110 entering into a geo-fenced area, a connection to a WiFi network, and the like. Moreover, the location determination may be an actual location or a relative location. For example, if the location is obtained from GPS 118, the location would be specific latitude and longitude. In contrast, if a beacon in a retail store is used by an app on the mobile device to demine the location of mobile device 110, then the location would be somewhere within the broadcast range of the beacon. Similarly, the location could be determined as being within a geo-fenced area, or the like.

Once the location information for mobile device 110 is determined, the location could be used to obtain offers for the customer based on the location of mobile device 110.

Figure 2:
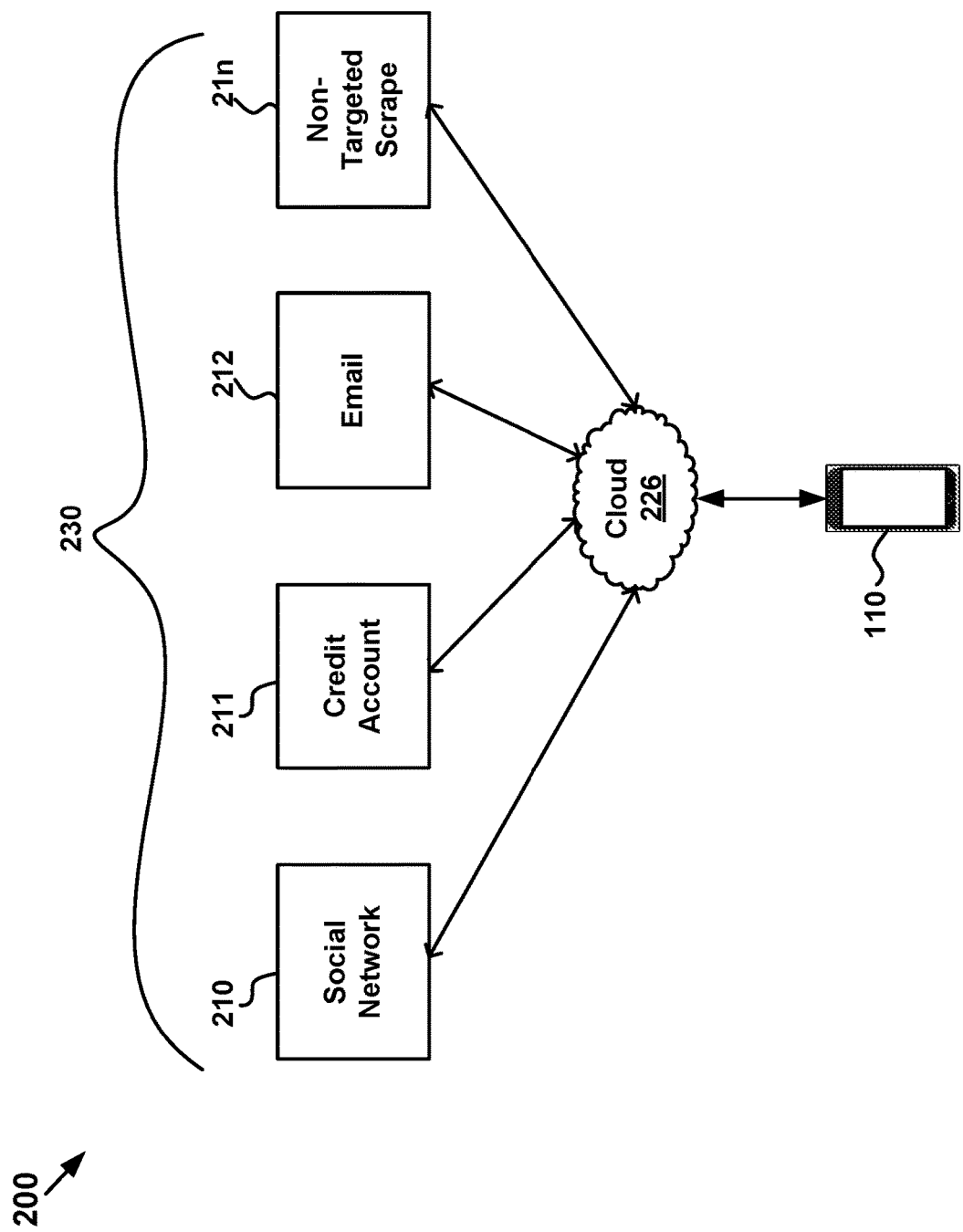
FIG. 2 is a block diagram of a computing device communicating via the cloud to a plurality of different platforms, in accordance with an embodiment.

With reference now to FIG. 2, a block diagram 200 of a mobile device 110 communicating via the cloud 226 to a plurality of different offer platforms 210-21*n* having a plurality of offers 230 are shown in accordance with an embodiment. Although a number of distinct offer platforms 210-21*n* are shown in block diagram 100, it should be appreciated that one or more of the offer platforms 210-21*n* could be found in a similar storage location, operating on mobile device 110, on applications stored on mobile device 110, or the like. For example, platform 210 is a (or a plurality of different) social network(s). Platform 211 is a (or a plurality of different) credit account(s). Platform 212 is an (or a plurality of different) email account(s). Platform 21*n* is an (or a plurality of different) Internet site(s) that can be scraped for non-targeted offers.

Mobile device 110 has wireless connectivity and would be capable of broadcasting and receiving via at least one network cloud 226. Cloud 226 represents a wired or wireless network such as the Internet, a wide area network (WAN), local area network (LAN), or the like. A wired network can include Ethernet cable(s), phone line(s), router(s), switch(es), and the like. Wireless communication network examples include: WiFi, Cellular, Bluetooth, NFC, and the like.

In the diagram, although a plurality of different offer platforms 210-21n are shown, it should be appreciated that there may be more of fewer offers in one or more of the different offer platforms 210-21n. For example, platform 210 could include any and/or all of the social networks to which the customer is affiliated. Moreover, platform 210 would include social networks that are accessed over the Internet as well as social networks that are accessed via an app on the mobile device 110.

Platform 211 could include any and/or all of the credit accounts to which the customer has access. Moreover, platform 211 would include credit accounts that are accessed over the Internet as well as credit accounts that are accessed via an app on the mobile device 110.

Platform 212 could include any and/or all of the different email accounts associated with the customer. Moreover, platform 212 would include email accounts that are accessed over the Internet as well as email accounts that are accessed via an app on the mobile device 110.

Platform 21n could include any number of different web sites, search engines, and the like. Moreover, platform 21n would include web sites, search engines, and the like that are accessed over the Internet as well as apps that are on the mobile device 110.

Although the offer platforms 210-21n of FIG. 2 are shown as being a network connection away from mobile device 110, it should be appreciated that one or more of the offer platforms 210-21n could be operating on mobile device 110, such as applications on mobile device 110, or the like. The distinct separation of offer platforms 210-21n and mobile device 110 in FIG. 2 is provided merely for purposes of clarity.

Figure 3:
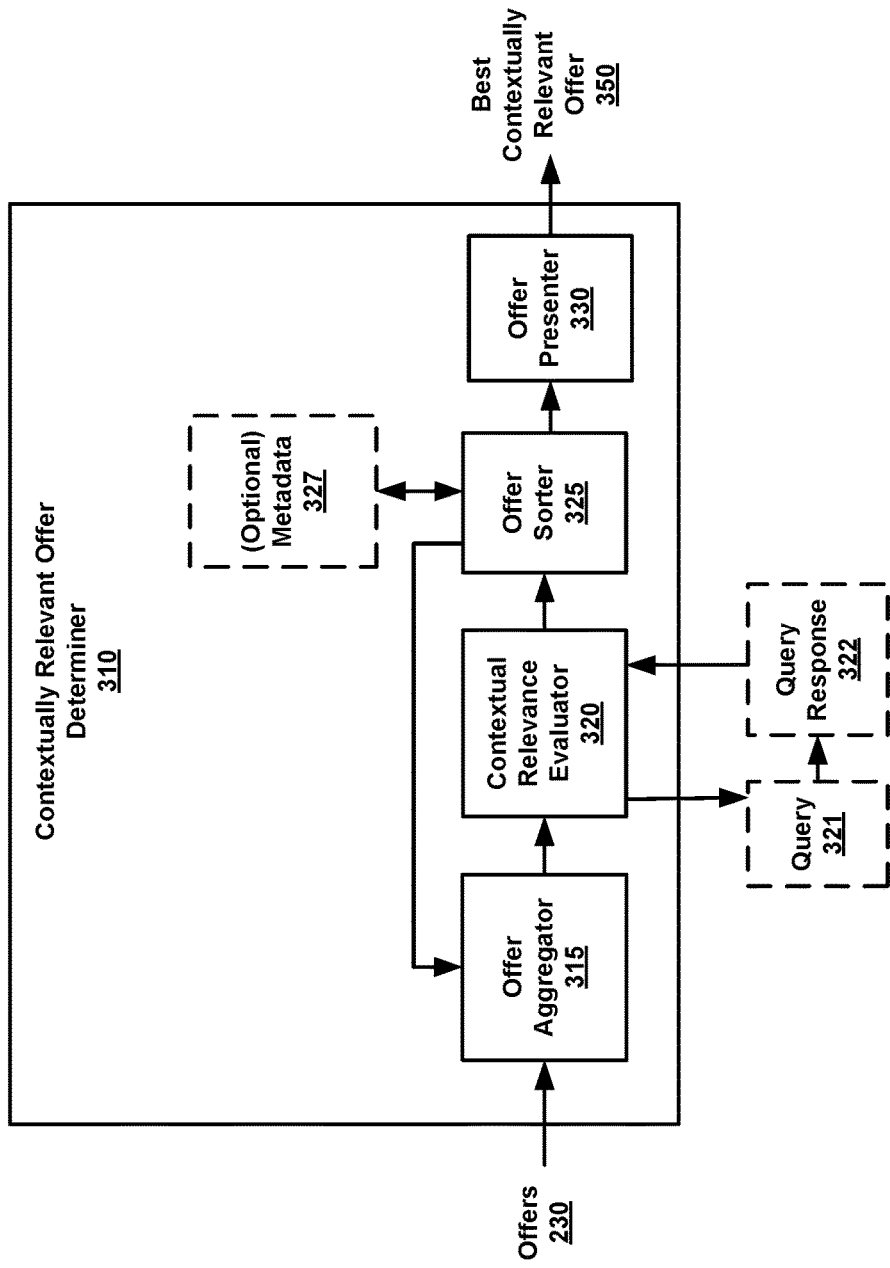
FIG. 3 is a block diagram of a contextually relevant offer determiner to automatically aggregate, evaluate, sort, and provide a contextually relevant offer, in accordance with an embodiment.

Referring now to FIG. 3, a block diagram 300 of a contextually relevant offer determiner 310 to automatically aggregate, evaluate, sort, and provide a contextually relevant offer is shown in accordance with an embodiment. FIG. 3 includes offers 230, contextually relevant offer determiner 310, optional query 321 and query response 322, and best contextually relevant offer 350.

In one embodiment, contextually relevant offer determiner 310 is an application operating on the entity's mobile device 110. In one embodiment, the app is a free App that could be provided and maintained by a specific company, brand, credit account provider, or the like. In one embodiment, the customer would pay for the App as an upfront single payment cost. In another embodiment, the customer would pay for the App on a monthly payment. In one embodiment, the customer would receive a monthly (or other timeframe) cost savings analysis from the App. That is, the customer would receive a cost saving breakdown that would show the amount of money the customer has saved by using the App over the given time period, in total, or the like.

Figure 5:
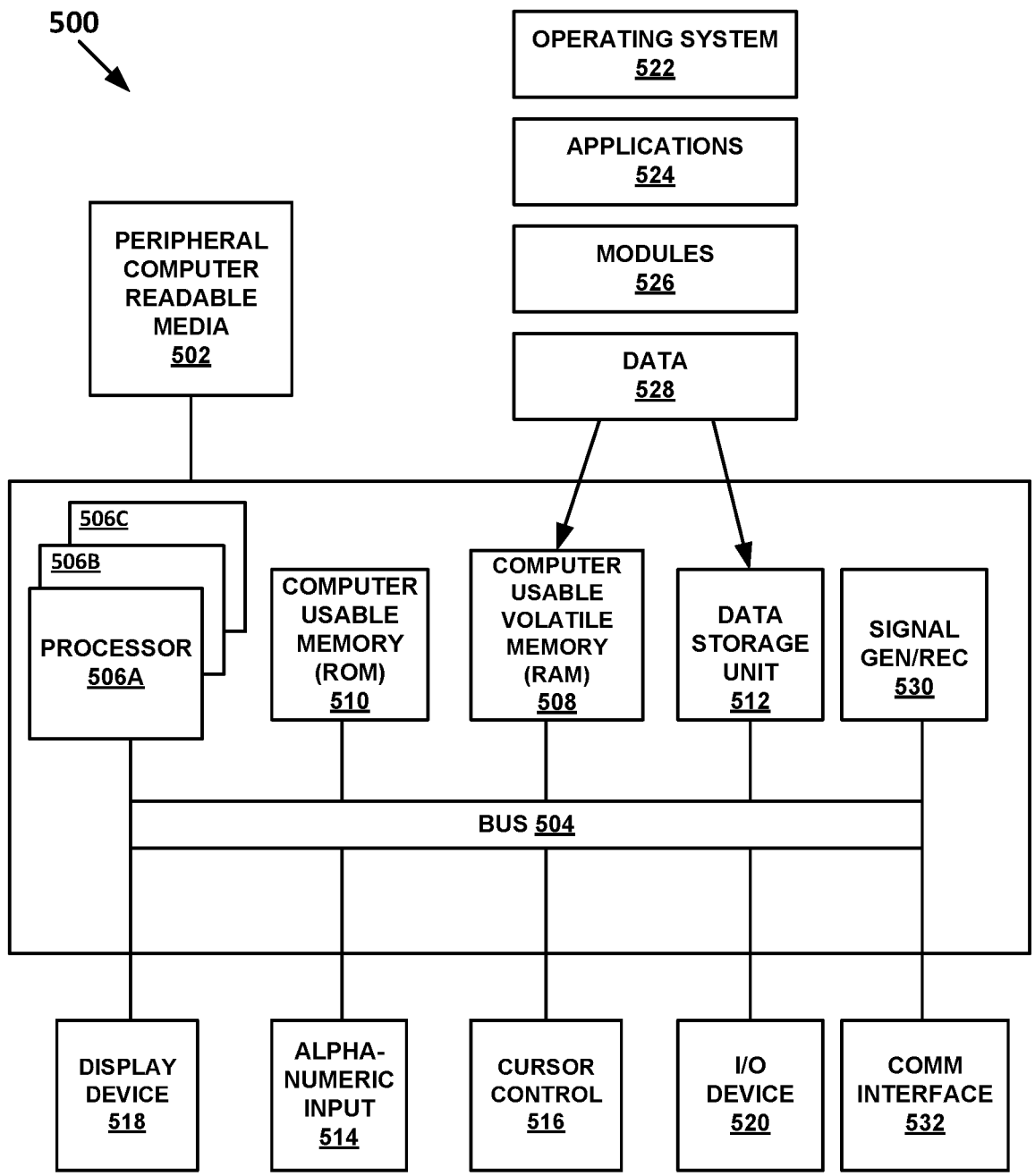
FIG. 5 is a block diagram of an example computer system with which or upon which various embodiments of the present invention may be implemented.

In another embodiment, contextually relevant offer determiner 310 operates on a remote server that includes memory, processors, applications, operating systems and the like (such as described in FIG. 5). If contextually relevant offer determiner 310 operates on a remote server it could communicate with mobile device 110 on a secure channel via cloud 226.

In one embodiment, contextually relevant offer determiner 310 is a computing system such as computer system 500 described in detail in the FIG. 5 discussion herein. In one embodiment, contextually relevant offer determiner 310 includes offer aggregator 315, contextual relevance evaluator 320, offer sorter 325, optional metadata 327, and offer presenter 330. Although a number of distinct components are shown in block diagram 300, it should be appreciated that one or more of the components of contextually relevant offer determiner 310 may be combined. Similarly, one or more of the components of contextually relevant offer determiner 310 could be located separately from one another and communicate via cloud 226 or the like.

Offer aggregator 315 obtains a plurality of offers 230. For example, the plurality of offers 230 could be obtained by searching one or more of a customer's social media platforms, one or more of a customer's credit accounts, one or more of a customer's email accounts, one or more Internet websites, one or more images in a memory of a customer's mobile device, and the like, and in any combination thereof.

For example, the customer is going to shop at Shannon's emporium today. Instead of the customer having to search the different offers over the different medias for the best offer at Shannon's emporium, offer aggregator 315 will have already collected the offers from each of the customer's different electronic channels. The contextually relevant offer determiner can then provide the best offer available to the customer during the checkout process at Shannon's emporium.

In general, the offers could be brand offers, targeted offers, etc. For example, the targeted store offer could be a 10% off any item savings. At the same time the brand could have a global offer for 15% off any item savings.

Contextual relevance evaluator 320, makes a relevance evaluation for each of the plurality of offers 230. The contextual relevance would include aspects such as the customer is at a certain clothing shop. Subsequently, clothing offers, offers from the certain shop, offers from competitors of the certain shop, and the like would receive a higher contextual relevance rating.

In one embodiment, contextual relevance evaluator 320, will provide a query 321 to the customer in order to make a more precise determination. The query response 322 will then be utilized by contextual relevance evaluator 320 to determine the contextual relevance of each of the plurality of offers.

Offer sorter 325, will sort each of the plurality of offers into a best contextually relevant offer to a least contextual relevant offer order. The order would be based on the relevancy rating provided for each offer by the contextual relevance evaluator 320. In one embodiment, the offer sorter will optionally utilize metadata 327 that is included with the offer to provide an additional level of sorting. If the offer does not include any metadata then there will be no additional sorting, but if an offer does include metadata, the metadata could be, but is not limited to: an expiration date of the offer (e.g., the offer expires on date . . . ), an alternative tender value (e.g., 300 points is worth double the amount that 250 points would be worth in a specific use case), a customer history (e.g., this offer is provided because the customer is a frequent buyer), an interest rate (e.g., this credit account interest rate is xx), a reduced rate length (e.g., this credit account has a reduced interest rate for purchases made this week), a no interest length (e.g., this credit account has a 0% interest rate for x months), and the like. After the metadata is reviewed, it can be used to re-sort each of the plurality of offers into a metadata based best contextually relevant offer to least contextually relevant offer order.

Offer presenter 330 will provide the best contextually relevant offer 350 for use in the transaction. In one embodiment, offer presenter 330 will automatically provide the best contextually relevant offer 350 from the contextually relevant offer determiner 310 (which may be on mobile device 110) directly to the transaction system. In another embodiment, offer presenter 330 will provide the best contextually relevant offer 350 from the contextually relevant offer determiner 310 (which may be on mobile device 110) to a display of the mobile device 110 for the customer to either act in accordance with or provide to the checkout system. For example, if the best contextually relevant offer 350 is a free desert, the offer presenter 330 would provide that information to the customer prior to payment so that the customer can order the free desert.

In another example, the best contextually relevant offer 350 may include a plurality of relevant offers that would require the customer to make a decision between the two or more relevant offers. In that case, as described in detail herein, the offer presenter 330 would provide the different offers (and possibly a reason for the optional offer situation) to the customer prior to payment so that the customer can select the offer that they would prefer.

Figure 4:
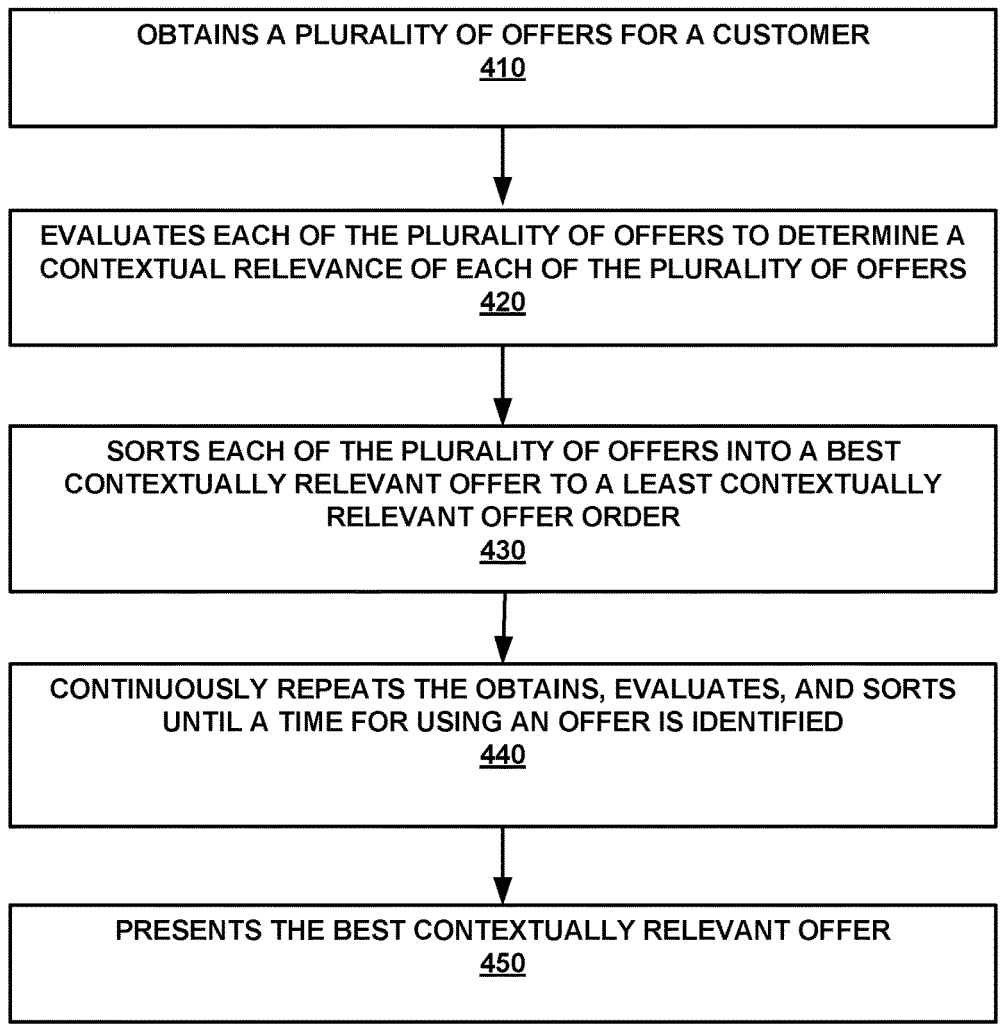
FIG. 4 is a flowchart of a method for automatically aggregating, evaluating, and providing a contextually relevant offer, in accordance with an embodiment.

With reference now to FIG. 4, a flowchart 400, a method for automatically aggregating, evaluating, and providing a contextually relevant offer to a customer is shown in accordance with an embodiment.

With reference now to 410 of FIG. 4, one embodiment obtains a plurality of offers for a customer. For example, the plurality of offers can be obtained by searching one or more of a customer's social media platforms for one or more of the plurality of offers. In one embodiment, the search for one or more of the plurality of offers could include searching one or more of a customer's credit accounts, one or more of a customer's email accounts, one or more Internet websites, one or more images in a memory of a customer's mobile device, and the like.

Referring now to 420 of FIG. 4, one embodiment evaluates each of the plurality of offers to determine a contextual relevance of each of the plurality of offers. In one embodiment, the evaluating is driven by received customer contextual reference input that defines at least one contextual relevance. The received customer contextual reference input is used to determine the contextual relevance of each of the plurality of offers. Then, each of the plurality of offers is sorted into the best contextually relevant offer to the least contextual relevant offer order based on the customer contextual reference input.

With reference now to 430 of FIG. 4, one embodiment sorts each of the plurality of offers into a best contextually relevant offer to a least contextually relevant offer order. In one embodiment, a query is provided to the customer on a display of the customer's mobile device 110. When the response to the query is received, it is utilized to re-evaluate and/or re-sort each of the plurality of offers into a query response based best contextually relevant offer to least contextually relevant offer order.

Referring now to 440 of FIG. 4, one embodiment continuously repeats the obtaining, evaluating, and sorting until a time for using an offer is identified. In one embodiment, each of the plurality of offers in the best contextually relevant offer to the least contextual relevant offer order is reviewed for a metadata. The metadata could be, but is not limited to: an expiration date, an alternative tender value, a customer history, an interest rate, a reduced rate length, a no interest length, and the like. After the metadata is reviewed, it can be used to re-sort each of the plurality of offers into a metadata based best contextually relevant offer to least contextually relevant offer order.

With reference now to 450 of FIG. 4, one embodiment presents the best contextually relevant offer.

The following examples are provided to further clarity the operation of contextual relevance evaluator 320.

In one embodiment, the best-offer provided to the customer is evaluated by the contextually relevant offer determiner 310 and the evaluation includes situationally dependent information. For example, the customer may be eating at John's chili house. The customer could have received a number of offers from John's chili house via one or more of the different customer channels. One offer could be for a free desert and another different offer could be for 20% off of the final bill.

Straight Forward Analysis

For example, if the customer is eating alone, the contextually relevant offer determiner 310 would evaluate the available offers to find the best value available. For example, the customer's bill is $20 and the desert is $6. The contextually relevant offer determiner 310 would determine that using the 20% off of the entire bill would only be a $4 discount which is a lesser amount than the free desert offer (e.g., a $6 discount). As such, the contextually relevant offer determiner 310 would provide the customer with the free desert offer to obtain the best savings based on the offers available.

In contrast, if the customer is eating with her family of four, the contextually relevant offer determiner 310 would again evaluate the available offers to find the best value available. Now however, the customer's bill is $80.00 while the desert remains at $6. The contextually relevant offer determiner 310 would determine that using the 20% off of the entire bill would be a $16 discount while the free desert offer would remain a $6 discount. As such, the contextually relevant offer determiner 310 would provide the customer with the 20% off offer to obtain the best savings based on the offers available.

Expiration Analysis

In one embodiment, the customer has the same two offers available and the customer is eating with her family of four. The contextually relevant offer determiner 310 would again evaluate the available offers to find the best value available. Again, the customer's bill is $80.00 while the desert remains at $6. The contextually relevant offer determiner 310 would determine that using the 20% off of the entire bill would be a $16 discount while the free desert offer would remain a $6 discount.

However, the contextually relevant offer determiner 310 would also note that the expiration date of the free desert offer is in 2 days while the 20% off offer is for the entire month (25 remaining days). Further, in one embodiment, the contextually relevant offer determiner 310 would look to the customer's purchase history and determine a probability that the customer would again frequent the restaurant before the month is out.

In one embodiment, if the contextually relevant offer determiner 310 determines the probability that the customer will return within the 25 remaining days is above a threshold value, the contextually relevant offer determiner 310 would automatically provide the customer with the about to expire free desert offer even though it is not the most money savings offer presently available. That is, the contextually relevant offer determiner 310 would determine that using the about to expire coupon now would provide a first customer savings now and provide a second additional customer savings in the future, after the free desert offer has expired but while the 20% off offer is still available.

In contrast, if the contextually relevant offer determiner 310 determines the probability that the customer will return within the 25 remaining days is low, the contextually relevant offer determiner 310 would automatically provide the customer with the offer for 20% off of the entire meal purchase. That is, the contextually relevant offer determiner 310 would determine that using the about to expire coupon now would not be a best benefit to the customer since it is likely the offer for 20% off would expire before the customer returned in the future.

In one embodiment, the contextually relevant offer determiner 310 will not automatically provide the free desert offer, but will instead provide both offers to the customer with both savings opportunities and an indicator next to the offer that the contextually relevant offer determiner 310 believes to be the best offer based on the expiration scenario. In one embodiment, the contextually relevant offer determiner 310 could also provide an explanation with the offer presentation, or the presentation could include a link that the customer could follow to view the contextually relevant offer determiner 310's reasoning for the use of the less valuable offer at the present time. As such, the customer would review the two best offers provided by the contextually relevant offer determiner 310 along with any reasoning and select whichever offer they would like to use.

In general, the probability threshold could be a programmed threshold value, or a customer established and modifiable threshold value, or the like. Moreover, the threshold value could change based on the disparity between the offers in question. For example, if the offer about to expire is the offer for a free desert, the threshold value for an offer for 20% off that will expire at the end of the month would be higher than an offer for 50% off that will expire at the end of the month. In other words, the contextually relevant offer determiner 310 would weigh the loss of the use of the 20% off offer less than it would weigh the loss of the use of the 50% off offer.

For example, if the customer's purchase history puts the odds of the customer returning to the restaurant within the 25 remaining days at 50%, the contextually relevant offer determiner 310 could still offer the free desert over the 20% off offer. However, in the same scenario where customer's purchase history puts the odds of the customer returning to the restaurant within the 25 remaining days at 50%, the contextually relevant offer determiner 310 would replace the offer the free desert with the 50% off offer.

In one embodiment, as discussed in further detail herein, in addition to (or in place of) the review of the customer's purchase history, the contextually relevant offer determiner 310 would provide a query to the customer requesting input from the customer about the customer's plans of returning within the 25-day period. The query could further include questions such as the probable size of the group that would be included in the next visit, etc.

Future Use Analysis

In one embodiment, if the customer is eating alone, the contextually relevant offer determiner 310 could determine that the 10% off is not as good of a choice for use as the free desert offer. For example, if the customer often goes to John's chili house with her family of four, it would be better to save the 10% off the entire bill coupon for the entire family outing, and as such, the free desert would provide the better offer in this particular situation.

In one embodiment, the customer has the same two offers available and the customer is eating alone. The contextually relevant offer determiner 310 would again evaluate the available offers to find the best value available. In this example, the customer's bill is $40.00 while the desert remains at $6. The contextually relevant offer determiner 310 would determine that using the 20% off of the entire bill would be a $8 discount while the free desert offer would remain a $6 discount.

However, the contextually relevant offer determiner 310 would also look to the customer's eating history and determine a probability that the customer would again frequent the restaurant, and likely with the entire family. The contextually relevant offer determiner 310 could also note that the normal bill for the entire family is $80.

In one embodiment, the contextually relevant offer determiner 310 would automatically provide the customer with the free desert offer even though it is not the most money savings offer presently available. That is, the contextually relevant offer determiner 310 would determine that using the 20% off coupon now would provide a first customer savings of 8 dollars while using the 20% off coupon in the future would result in a $16 savings, while the free desert offer would be a $6 savings at either time.

In one embodiment, the contextually relevant offer determiner 310 will not automatically provide the free desert offer, but will instead provide both offers to the customer with both savings opportunities and an indicator next to the offer that the contextually relevant offer determiner 310 believes to be the best offer based on the future use scenario. In one embodiment, the contextually relevant offer determiner 310 could also provide an explanation with the offer presentation, or the presentation could include a link that the customer could follow to view the contextually relevant offer determiner 310 reasoning for the use of the less valuable offer at the present time. As such, the customer would review the two best offers provided by the contextually relevant offer determiner 310 along with any reasoning and select whichever offer they would like to use for the present situation.

Customer Query

In one embodiment, instead of the contextually relevant offer determiner 310 looking to the customer's eating (spending, etc.) history and/or determining a probability that the customer would again frequent the restaurant, the contextually relevant offer determiner 310 may provide a query to the customer. For example, the contextually relevant offer determiner 310 could ask the customer if they plan to return to the restaurant before a certain date (e.g., an offer expiration date), how many people are in their party, if they plan to return to the restaurant at a later date with their family (or a larger group of people) which will likely result in a higher total bill, if they are planning on having a desert, if they are planning on returning at a later time and having a desert then, etc.

In another embodiment, the contextually relevant offer determiner 310 could query the customer to determine the customer's present configuration (e.g., is the customer alone, with one other person, with their family, with a larger group of people, etc.). Based on the customer's response to the query, the contextually relevant offer determiner 310 would evaluate the offers available to the customer and then make a decision or suggestion to the customer. For example, if the customer's response is that the customer is alone or in a small group, the contextually relevant offer determiner 310 could inform the customer that there is an available offer for a free desert and that the free desert offer is likely the most valuable offer available to the customer at this time. This information would allow the customer to modify their order at the restaurant based on the best available offer provided by the contextually relevant offer determiner 310.

Buyer/Wrong Offer Remorse

Such actions would allow the customer to not be hit with buyer remorse (e.g., did not use the best available offer) or hit with wrong offer use remorse; e.g., the customer used the 20% off offer at the restaurant today when they went to lunch and had a separate bill instead of using the desert offer and keeping the 20% offer for a day next week when she is planning on going to the restaurant with her family.

Moreover, although the examples described thus far focus on shopping or eating, they are exemplary. The present technology is well suited for numerous offer collection/evaluation/and presentation across fields such as airline miles, hotel rewards, credit account cash back offers, and the like. In one embodiment, contextually relevant offer determiner would also receive (or obtain) information concerning point redemption. The information could include points expiration information, point use threshold information, and the like. Although points are discussed, the same redemption information could be provided for programs that offer miles or other cumulative deal scenarios.

In general, point use threshold information refers to a maximum and/or minimum limit to the amount of points that could be redeemed by a customer. Examples of point use thresholds include: a top limit for the maximum number of points that can be redeemed for a single purchase, a low limit for the minimum number of points that can be redeemed for a single purchase, a high cumulative limit for the maximum number of points that can be redeemed over a given time period (e.g., a week, month, quarter, year, etc.), and the like. In one embodiment, the point use threshold information may differ by brand, by product, or the like. In one embodiment, the point use threshold information is utilized in order to provide liability control.

Cumulative Deals

For example, the customer would like to fly to Hawaii for a vacation. The contextually relevant offer determiner 310 would look at the customer's offers and determine that the customer could pay $500 or use 50,000 airline miles. The contextually relevant offer determiner 310 would then evaluate the pluses and minuses of each. For example, the cash back value of the 50,000 airline points (e.g., $400), the maximum airline ticket value for 50,000 miles (e.g., $750), etc. In one embodiment, the contextually relevant offer determiner 310 would determine the better value (in this example, the contextually relevant offer determiner 310 would determine that paying the $500 is the better value) and then automatically provide that tender to make the purchase.

In another embodiment, the contextually relevant offer determiner 310 would make the better value determination (e.g., pay the $500) and then provide both options to the customer thereby allowing the customer to make the final determination.

In one embodiment, the contextually relevant offer determiner 310 could also provide an explanation with the presentation of both options, or the presentation could include a link that the customer could follow to view the contextually relevant offer determiner 310 reasoning for using the suggested option. As such, the customer would review the options provided by the contextually relevant offer determiner 310 along with any reasoning and select whichever option they would like to use for the present situation. In so doing, the customer would be making the purchase from a completely informed position and would not be facing remorse at a later time.

In one embodiment, a hotel example would be similar to the flight example above. That is, the customer is planning to stay in a hotel for a week (e.g., 7 days). The contextually relevant offer determiner 310 would look at the customer's offers and determine that the customer could pay $700 or use 50,000 hotel points. The contextually relevant offer determiner 310 would then evaluate the pluses and minuses of each. For example, the cash back value of the 50,000 hotel points (e.g., $0), the maximum value for the 50,000 points (e.g., 7 days), etc. In one embodiment, the contextually relevant offer determiner 310 would determine the better value (in this example, the contextually relevant offer determiner 310 would determine that using the 50,000 hotel points is the better value) and then automatically provide that tender to make the purchase.

In another embodiment, the contextually relevant offer determiner 310 would make the better value determination (e.g., use the 50,000 hotel points) and then provide both options to the customer thereby allowing the customer to make the final determination.

In one embodiment, the contextually relevant offer determiner 310 could also provide an explanation with the presentation of both options, or the presentation could include a link that the customer could follow to view the contextually relevant offer determiner 310 reasoning for using the suggested option. As such, the customer would review the options provided by the contextually relevant offer determiner 310 along with any reasoning and select whichever option they would like to use for the present situation. In so doing, the customer would be making the purchase from a completely informed position and would not be facing remorse at a later time.

Cumulative Deals with Expiration

Using the example above, the customer would like to fly to Hawaii for a vacation. The contextually relevant offer determiner 310 would look at the customer's offers and determine that the customer could pay $500 or use 50,000 airline miles. The contextually relevant offer determiner 310 would then evaluate the pluses and minuses of each. For example, the cash back value of the 50,000 airline points (e.g., $400), the maximum airline ticket value for 50,000 miles (e.g., $750), etc.

However, unlike the above example, the contextually relevant offer determiner 310 would also identify that 30,000 of the customer's points will expire within a predefined time period (e.g., a day, week, inside of the customer's normal next travel time period, within the time period after a next travel query is provided to the customer, etc.). In one embodiment, based on the expiring points scenario, the contextually relevant offer determiner 310 would determine the better value (in this example, the contextually relevant offer determiner 310 would determine that using the points since 30,000 are about to expire is the better value) and then automatically provide that tender to make the purchase.

In another embodiment, the contextually relevant offer determiner 310 would make the better value determination (e.g., use the points since 30,000 are about to expire) and then provide both options to the customer thereby allowing the customer to make the final determination.

In one embodiment, the contextually relevant offer determiner 310 could also provide an explanation with the presentation of both options, or the presentation could include a link that the customer could follow to view the contextually relevant offer determiner 310 reasoning for using the suggested option. As such, the customer would review the options provided by the contextually relevant offer determiner 310 along with any reasoning and select whichever option they would like to use for the present situation. In so doing, the customer would be making the purchase from a completely informed position and would not be facing remorse at a later time.

Credit Account Decisions

In one embodiment, a particular credit account to use for making a payment could be determined by the contextually relevant offer determiner 310. For example, the customer is planning to take a vacation to the Keys (at a cost of $2500). The contextually relevant offer determiner 310 would look at the customer's credit accounts and the associated offers and determine that the customer could use a credit account A that has no interest for 18 months to pay for the vacation or the customer could use a credit account B that has an 18% APR but provides 3% cash back to pay for the trip. The contextually relevant offer determiner 310 would then evaluate the different offers. For example, the cash back value of for credit card B would be $75 and the interest accrued on credit account B would exceed $75 dollars in 4 months. In one embodiment, the contextually relevant offer determiner 310 would provide both options to the customer thereby allowing the customer to make the final determination as to which credit card to use.

In one embodiment, the contextually relevant offer determiner 310 would make a query to determine how long the customer was planning to take to pay off the vacation cost. When the customer provides the payment timeline, the contextually relevant offer determiner 310 could use the payoff timeline to automatically make the purchase using the determined credit account. for example, if the customer's payment timeline is within 3 months, then the contextually relevant offer determiner 310 would use credit account B. However, if the customer's payment timeline is a year, then the contextually relevant offer determiner 310 would automatically use credit account A.

In another embodiment, the contextually relevant offer determiner 310 would make the better value determination and then provide both options to the customer thereby allowing the customer to make the final determination and make the payment. In one embodiment, the contextually relevant offer determiner 310 would provide an explanation with the presentation of both options, or the presentation could include a link that the customer could follow to view the contextually relevant offer determiner 310 reasoning for using the suggested option. As such, the customer would review the options provided by the contextually relevant offer determiner 310 along with any reasoning and select whichever option they would like to use for the present situation. In so doing, the customer would be making the purchase from a completely informed position and would not be facing remorse at a later time.

More than Two Offers in the Evaluation

Although the examples focus on the evaluation of two offers, they are exemplary. The present technology is well suited for numerous offer collection/evaluation/and presentation across fields such as airline miles, hotel rewards, credit account cash back offers, and the like.

For example, using the above Hawaii vacation. The contextually relevant offer determiner 310 would look at the customer's offers and determine that the customer could pay $500 or use 50,000 airline miles. The contextually relevant offer determiner 310 would then evaluate the pluses and minuses of each. For example, the cash back value of the 50,000 airline points (e.g., $400), the maximum airline ticket value for 50,000 airline miles (e.g., $750), etc. In one embodiment, the contextually relevant offer determiner 310 would determine the better value (in this example, the contextually relevant offer determiner 310 would determine that paying the $500 is the better value).

In one embodiment, the contextually relevant offer determiner 310 would automatically make the better value determination (e.g., pay the $500 and don't use the accumulated points). In another embodiment, the contextually relevant offer determiner 310 would make the better value determination (e.g., pay the $500 and don't use the accumulated points) and then provide both options to the customer thereby allowing the customer to make the final determination.

In either the automatic or customer selected scenario, once the $500 payment was established, the contextually relevant offer determiner 310 would look at the customer's credit accounts and their associated offers and determine that the customer could use a credit account A that has no interest for 18 months to pay for the vacation or the customer could use a credit account B that has an 18% APR but provides 3% cash back to pay for the vacation. The contextually relevant offer determiner 310 would then evaluate the different offers. For example, the cash back value of for credit card B would be $75 and the interest accrued on credit account B would exceed $75 dollars in 18 months.

In one embodiment, the contextually relevant offer determiner 310 would make a customer query to find out how long the customer was planning to take to pay off the vacation cost. When the customer provides the payment timeline, the contextually relevant offer determiner 310 could use the payoff timeline to automatically make the credit account determination. For example, if the customer's payment timeline is within 18 months, then the contextually relevant offer determiner 310 would use credit account B to make the Hawaii vacation purchase. However, if the customer's payment timeline is two years, then the contextually relevant offer determiner 310 would automatically use credit account A to make the Hawaii vacation purchase.

In one embodiment, once the contextually relevant offer determiner 310 made the better value determination (e.g., pay the $500 with credit account B), the contextually relevant offer determiner 310 would then automatically make the payment using credit account B.

In another embodiment, once the contextually relevant offer determiner 310 made the better value determination (e.g., pay the $500 with credit account B), the contextually relevant offer determiner 310 would then provide both options to the customer thereby allowing the customer to make the final determination and complete the payment.

At any of the stages where the contextually relevant offer determiner 310 provides the results of the decision to the customer for final approval, the contextually relevant offer determiner 310 could also provide an explanation with the presentation of each of the different options, or the presentation could include a link that the customer could follow to view the contextually relevant offer determiner 310 reasoning for using the suggested combination of options. As such, the customer would review the options provided by the contextually relevant offer determiner 310 along with any reasoning and select whichever options they would like to use for the present situation. In so doing, the customer would be making the purchase from a completely informed position and would not be facing remorse at a later time.

For example, the customer may have been planning on using the airline points for the trip. As such, the customer would select the points as the means of payment even though the contextually relevant offer determiner 310 had suggested differently.

Competing Offer Negotiation

The contextually relevant offer determiner could further be a dynamic engine that provides details about an offer provided by a competitor (e.g., Able) to a different company or brand (e.g., Foxtrot) that is in the same competitive market. For example, the contextually relevant offer determiner determines that Foxtrot has provided an offer (e.g., Foxtrot's offer) and that a competitor Able has also provided an offer (e.g., Able's initial offer) that is better than Foxtrot's initial offer. In one embodiment, the contextually relevant offer determiner 310 would notify Foxtrot that the customer has received Able's initial offer and that Able's initial offer is a better offer. Depending upon privacy issues, legal issues, and the like, the notification from the contextually relevant offer determiner 310 to Foxtrot may include some or all the details of Able's initial offer. This would allow Foxtrot the opportunity to dynamically adjust their offer (e.g., Able's modified offer) to compete with (or better) Foxtrot's offer.

In one embodiment, Foxtrot may not be able to compete with (or better) Able's offer, but could instead provide offer enticement information to the contextually relevant offer determiner 310 that could be used by the contextually relevant offer determiner 310 during the evaluating process of the available offers. For example, the enticement information could be information such as, "although Foxtrot's offer is not as good as Abel's offer, if the customer uses Able's lesser offer now, they will reach the next tier of rewards in Able's rewards program which will mean significantly better rewards/offers/redemption in the future."

Thus, in one embodiment, contextually relevant offer determiner's evaluation and ranking decision tree can include a number of additional metrics such as, but not limited to: a review of available points for redemption to receive discounts, a value determination for partial point redemption, allow a point provider to provide dynamic adjustment of point redemption values for different categories (e.g., provide different weight to point value depending upon how points redeemed), and the like.

With reference now to FIG. 5, portions of the technology for providing a communication composed of computer-readable and computer-executable instructions that reside, for example, in a non-transitory computer-readable medium, a non-transitory computer-readable storage medium, or in non-transitory computer-readable storage media of a computer system. That is, FIG. 5 illustrates one example of a type of computer that can be used to implement embodiments of the present technology. FIG. 5 represents a system or components that may be used in conjunction with aspects of the present technology. In one embodiment, some or all of the components described herein may be combined with some or all of the components of FIG. 5 to practice the present technology.

FIG. 5 illustrates an example computer system 500 used in accordance with embodiments of the present technology. It is appreciated that system 500 of FIG. 5 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 5, computer system 500 of FIG. 5 is well adapted to having peripheral computer readable media 502 such as, for example, a disk, a compact disc, a flash drive, and the like coupled thereto.

Computer system 500 of FIG. 5 includes an address/data/control bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. Computer system 500 also includes data storage features such as a computer usable volatile memory 508, e.g., random access memory (RAM), coupled to bus 504 for storing information and instructions for processors 506A, 506B, and 506C.

System 500 also includes computer usable non-volatile memory 510, e.g., read only memory (ROM), coupled to bus 504 for storing static information and instructions for processors 506A, 506B, and 506C. Also present in system 500 is a data storage unit 512 (e.g., a magnetic disk drive, optical disk drive, solid state drive (SSD), and the like) coupled to bus 504 for storing information and instructions. Computer system 500 also includes an optional alpha-numeric input device 514 including alphanumeric and function keys coupled to bus 504 for communicating information and command selections to processor 506A or processors 506A, 506B, and 506C. Computer system 500 also includes an optional cursor control device 516 coupled to bus 504 for communicating user input information and command selections to processor 506A or processors 506A, 506B, and 506C. Optional cursor control device may be a touch sensor, gesture recognition device, and the like. Computer system 500 of the present embodiment also includes an optional display device 518 coupled to bus 504 for displaying information.

Referring still to FIG. 5, optional display device 518 of FIG. 5 may be a liquid crystal device, cathode ray tube, OLED, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick, non-contact input, gesture recognition, voice commands, bio recognition, and the like. In addition, special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

System 500 is also well suited to having a cursor directed by other means such as, for example, voice commands. Computer system 500 also includes an I/O device 520 for coupling system 500 with external entities. For example, in one embodiment, I/O device 520 is a modem for enabling wired or wireless communications between system 500 and an external network such as, but not limited to, the Internet or intranet. A more detailed discussion of the present technology is found below.

Referring still to FIG. 5, various other components are depicted for system 500. Specifically, when present, an operating system 522, applications 524, modules 526, and data 528 are shown as typically residing in one or some combination of computer usable volatile memory 508, e.g. random-access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present technology, for example, is stored as an application 524 or module 526 in memory locations within RAM 508 and memory areas within data storage unit 512. The present technology may be applied to one or more elements of described system 500.

System 500 also includes one or more signal generating and receiving device(s) 530 coupled with bus 504 for enabling system 500 to interface with other electronic devices and computer systems. Signal generating and receiving device(s) 530 of the present embodiment may include wired serial adaptors, modems, and network adaptors, wireless modems, and wireless network adaptors, and other such communication technology. The signal generating and receiving device(s) 530 may work in conjunction with one or more communication interface(s) 532 for coupling information to and/or from system 500. Communication interface 532 may include a serial port, parallel port, Universal Serial Bus (USB), Ethernet port, Bluetooth, thunderbolt, near field communications port, WiFi, Cellular modem, or other input/output interface. Communication interface 532 may physically, electrically, optically, or wirelessly (e.g., via radio frequency) couple computer system 500 with another device, such as a mobile phone, radio, or computer system.

The computing system 500 is only one example of a suitable computing environment and is not intended to suggest any limitation as to the scope of use or functionality of the present technology. Neither should the computing environment be interpreted as having any dependency or requirement relating to any one or combination of components illustrated in the example computing system 500.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A non-transitory computer-readable storage medium having instructions embodied therein that when executed cause a user's mobile computing device to perform a method comprising:
   automatically obtaining a plurality of digital offers, said automatically obtaining comprising:
      searching one or more social media platforms for one or more of the plurality of offers;
      searching one or more credit accounts of said user for one or more of the plurality of offers;
      searching one or more email accounts of said user for one or more of the plurality of offers;
      searching one or more Internet websites for one or more of the plurality of offers; and
      searching one or more images in a memory of said user's mobile computing device for one or more of the plurality of offers;
   reviewing each of the plurality of offers for a metadata, the metadata consisting of: an expiration date, an alternative tender value, a customer history, an interest rate, a reduced rate length, and a no interest length;
   receiving a contextual reference input, said contextual reference input defining a contextual relevance for said user, said contextual relevance selected from at least one of a group consisting of: a percentage off, a cash back value, a credit account APR, and a number of reward points;
   receiving an item of interest identified by said user;
   obtaining, from a global positioning system (GPS) on said user's mobile computing device, real-time location information;
   obtaining real-time situational information for said user;
   providing a query to the user;
   receiving a response to the query;
   automatically evaluating each of the plurality of digital offers to determine a contextual relevance value for each of the plurality of digital offers for said item of interest, wherein the evaluating utilizes said metadata from each of the plurality of offers, said user contextual reference input, and said response to said query in conjunction with said real-time location information and said real-time situational information to determine said contextual relevance value;
   automatically sorting each of the plurality of digital offers into a most contextually relevant digital offer to a least contextually relevant digital offer order;
   continuously repeating the automatically obtaining of said plurality of digital offers, said obtaining real-time location information, obtaining real-time situational information, said automatically evaluating, and said automatically sorting until a time for purchasing said item of interest is identified; and
   automatically presenting, on a display of said user's mobile computing device, the most contextually relevant digital offer for said item of interest at said identified time for purchasing.

2. A mobile device comprising:
   a display;
   a global position system (GPS), said GPS to determine real-time location information of said mobile device;
   a memory, said memory for storing instructions; and
   one or more processors, said one or more processors to execute the instructions, to:
      automatically obtain a plurality of offers for a user, the plurality of offers automatically obtained via a search comprising:
         one or more social media platforms for one or more of the plurality of offers;

one or more credit accounts of said user for one or more of the plurality of offers;
one or more email accounts for one or more of the plurality of offers;
one or more Internet websites for one or more of the plurality of offers; and
one or more images in said memory of said mobile device for one or more of the plurality of offers;
review each of the plurality of offers for a metadata, the metadata consisting of: an expiration date, an alternative tender value, a customer history, an interest rate, a reduced rate length, and a no interest length;
receive a contextual reference input, said contextual reference input to define a contextual relevance for said user, said contextual relevance selected from at least one of a group consisting of: a percentage off, a cash back value, a credit account APR, and a number of reward points;
receive an item of interest identified by said user;
obtain real-time situational information for said user;
provide a query to the user;
receive a response to the query;
automatically evaluate each of the plurality of offers to determine a contextual relevance value for each of the plurality of offers for said item of interest, wherein the evaluation utilizes said metadata from each of the plurality of offers, said user contextual reference input, and said response to said query in conjunction with said real-time situational information, and said real-time location information to determine said contextual relevance value;
automatically sort each of the plurality of offers into a most contextually relevant offer to a least contextually relevant offer order;
continuously repeat the automatic obtaining of said plurality of offers, said automatic obtaining of said real-time situational information, said automatic evaluation, and said automatic sorting until a time for purchasing said item of interest is identified; and
automatically present, on said display, the most contextually relevant offer for said item of interest at said identified time for purchasing.

\* \* \* \* \*